(12) United States Patent
Pastouchenko et al.

(10) Patent No.: US 12,590,559 B2
(45) Date of Patent: Mar. 31, 2026

(54) NACELLE INLET DUCT FOR A DUCTED FAN ENGINE

(71) Applicant: General Electric Company, Evendale, OH (US)

(72) Inventors: Nikolai Pastouchenko, Latham, NY (US); Kishore Ramakrishnan, Rexford, NY (US); Trevor H. Wood, Clifton Park, NY (US); Timothy Richard Depuy, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 19 days.

(21) Appl. No.: 18/891,458

(22) Filed: Sep. 20, 2024

(65) Prior Publication Data

US 2025/0012216 A1 Jan. 9, 2025

Related U.S. Application Data

(63) Continuation of application No. 17/819,426, filed on Aug. 12, 2022, now Pat. No. 12,116,932.

(51) Int. Cl.
*F02C 7/045* (2006.01)
*F01D 25/04* (2006.01)

(52) U.S. Cl.
CPC .............. *F02C 7/045* (2013.01); *F01D 25/04* (2013.01); *F05D 2220/32* (2013.01); *F05D 2260/96* (2013.01)

(58) Field of Classification Search
CPC .. F02C 7/045; F02C 7/24; F01D 25/04; F05D 2220/32; F05D 2260/96; F02K 3/06; F04D 29/665; F04D 29/668
(Continued)

(56) References Cited

U.S. PATENT DOCUMENTS 3,765,623 A 10/1973 Donelson et al.
5,915,403 A 6/1999 McConachie et al.
(Continued)

FOREIGN PATENT DOCUMENTS

EP 2955112 A1 12/2015
EP 3372789 A1 9/2018
GB 2364366 A 1/2002

OTHER PUBLICATIONS

Rienstra "Acoustic scattering at a hard-soft lining transition in a flow duct," Journal of Engineering Mathematics, vol. 59, Issue No. 4, pp. 451-475 (2007).
(Continued)

*Primary Examiner* — Yi-Kai Wang
(74) *Attorney, Agent, or Firm* — McCarter & English LLP

(57) ABSTRACT

An inlet duct for a nacelle of a ducted fan engine includes an inlet portion having an inlet lip and a hardwall portion, a highlight plane defined at an upstream end of the inlet portion, and an acoustic liner downstream of the inlet portion, a hardwall-acoustic liner interface defined at an interface of the hardwall portion and the acoustic liner. The inlet portion and the acoustic liner are coupled at an inlet-acoustic liner interface extending circumferentially about an inner circumferential surface of the inlet duct. The inlet lip varies circumferentially and axially with respect to the highlight plane and the inlet centerline axis, and includes a plurality of inlet lip crests arranged along the highlight plane, and a plurality of inlet lip troughs arranged downstream of the highlight plane. The hardwall-acoustic liner interface extends circumferentially about the inner circumferential surface and is arranged axially parallel to the highlight plane.

20 Claims, 19 Drawing Sheets

(58) Field of Classification Search
USPC .......................................................... 415/119
See application file for complete search history.

(56) References Cited

U.S. PATENT DOCUMENTS

| | | | | |
|---|---|---|---|---|
| 6,708,711 | B2 | 3/2004 | Surply et al. | |
| 8,985,507 | B2 | 3/2015 | Smith et al. | |
| 9,328,662 | B2 | 5/2016 | Smith et al. | |
| 10,393,020 | B2 | 8/2019 | Frank et al. | |
| 10,428,685 | B2 | 10/2019 | Morin et al. | |
| 10,612,464 | B2 | 4/2020 | Prasad et al. | |
| 10,941,708 | B2 | 3/2021 | Schwarz et al. | |
| 2005/0006529 | A1* | 1/2005 | Moe | B64D 33/02 244/134 D |
| 2005/0006539 | A1 | 1/2005 | Fischer et al. | |
| 2015/0369127 | A1* | 12/2015 | Gilson | F01D 25/24 415/119 |
| 2019/0093557 | A1* | 3/2019 | Thomas | B64D 15/08 |
| 2019/0211748 | A1* | 7/2019 | Pastouchenko | B64D 33/02 |
| 2022/0356839 | A1* | 11/2022 | LaBelle | B64D 33/02 |

OTHER PUBLICATIONS

Vahdati et al., “Mechanisms for Wide-Chord Fan Blade Flutter,” ASME Journal of Turbomachinery, vol. 133, Issue No. 4, (2011).

* cited by examiner 10
12
14
16
18
20
22
24
26
28
30
32
34
36
38
40
42
44
46
48
50
52
53
54
56
58
60
62
63
64
66
68
70
72
74
75
76
78
80
82
84
86
98
99
108
110
136
C
5

98

NACELLE INLET DUCT FOR A DUCTED FAN ENGINE

CROSS-REFERENCE TO RELATED APPLICATIONS

This application is a continuation of U.S. patent application Ser. No. 17/819,426 filed on Aug. 12, 2022, the contents of which are hereby incorporated by reference in their entirety.

TECHNICAL FIELD

The present disclosure relates to a nacelle inlet duct for a ducted fan engine.

BACKGROUND

Some ducted fan engines, such as gas turbine engines, generally include a nacelle that surrounds a fan assembly and a core engine. The nacelle includes an inlet duct upstream of the fan assembly and an intake airflow passes through the inlet duct to the fan assembly. At some operating conditions of the gas turbine, an acoustic wave generated by self-excited vibrations of fan blades in the fan assembly propagates in the upstream direction through the inlet duct, and, at an inlet end of the inlet duct, the acoustic wave may be reflected so as to propagate back into the inlet duct in the downstream direction. For specific fan speed ranges and/or operating conditions, the reflected acoustic wave propagating back through the inlet duct may reinforce the fan blade vibration, thereby resulting in flutter (i.e., vibrational instability of the fan). The vibrational instability of the fan significantly reduces the operating envelope of the fan blades; a phenomenon known as flutter bite.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
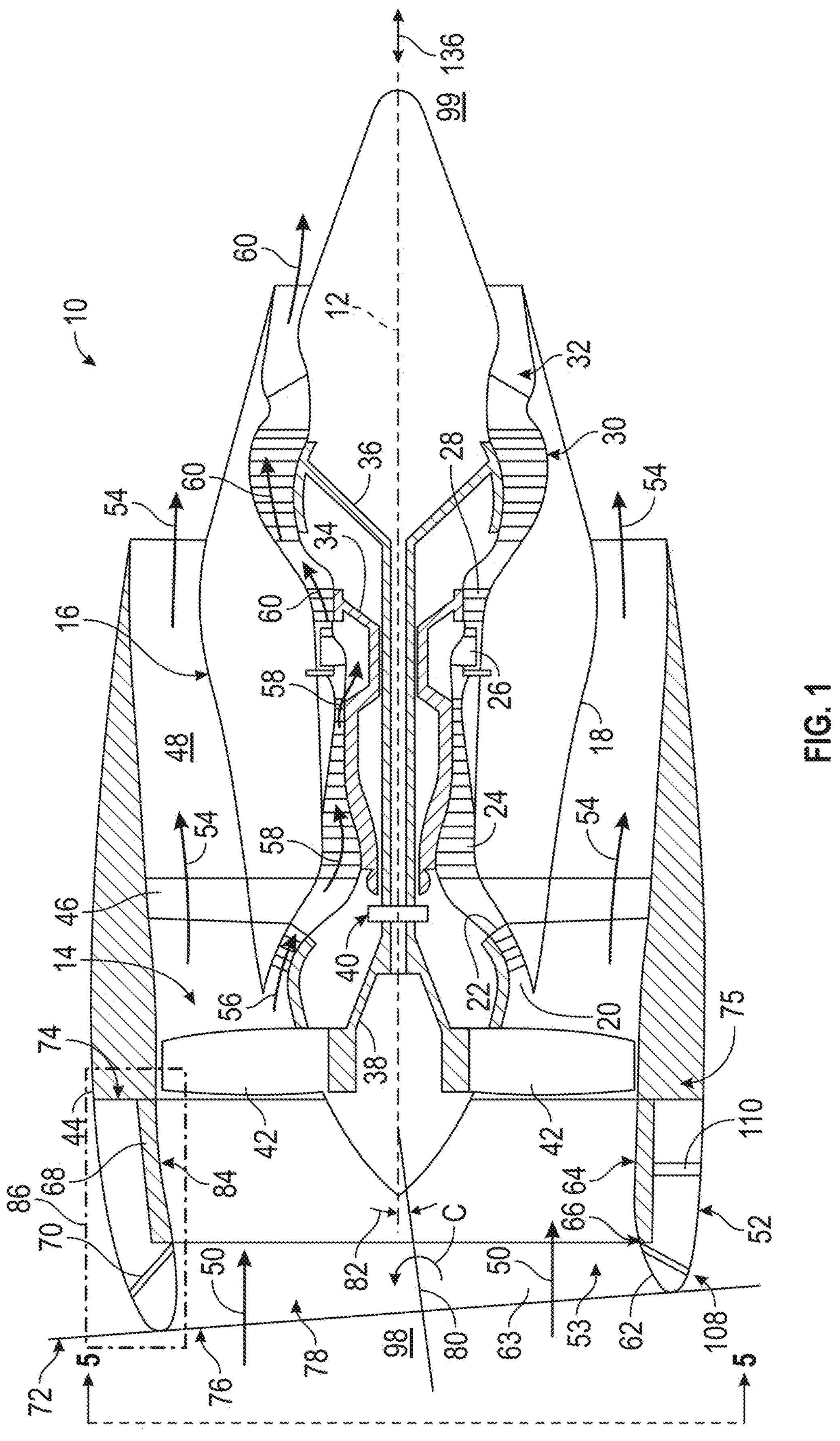
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some gas turbine engines generally include a nacelle that surrounds a fan assembly and a core engine. The nacelle includes an inlet duct upstream of the fan assembly and an intake airflow passes through the inlet duct to the fan assembly. At some operating conditions of the gas turbine, an acoustic wave generated by the fan assembly propagates in the upstream direction through the inlet duct along an upper side of the inlet duct, and, at an intake end of the inlet duct, the acoustic wave may be reflected back into the inlet duct along a lower side of the inlet duct so as to propagate in the downstream direction. For specific fan speed ranges or operating conditions, flutter of the fan blades may remove a bite from the map of stable operating conditions of the fan blades, resulting in a condition known as flutter bite. Acoustic resonance can arise where acoustic waves generated by the vibrating fan blades reflected from the engine inlet or from the liner/hardwall interface can come back towards the fan in a constructive phase and reinforce the undesired vibrations of the fan blades.

The present disclosure provides a technique for altering the magnitude and the phase of the reflected acoustic wave so as to attenuate the flutter bite. More particularly, the present disclosure provides an inlet duct of a nacelle that may, in one aspect, vary a hardwall-acoustic liner interface circumferentially and/or axially so as to alter the magnitude and the phase of the reflected acoustic wave. Alternatively, the magnitude and the phase of the reflected acoustic wave may be altered by providing a circumferentially and axially varying highlight portion to the inlet duct. In another aspect, the impedance of the acoustic liner may be varied so as to alter the magnitude and the phase of the reflected acoustic wave. In yet another aspect, the magnitude and the phase of the reflected acoustic wave may be altered by providing a series of projections extending from the acoustic liner into the inlet duct. Each of these techniques provides a technique to alter or decorrelate the magnitude and the phase of the reflected acoustic wave so as to reduce acoustic feedback into the blade vibration, resulting in a lower likelihood of flutter bite.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet and turboshaft gas turbine engines, or ducted fan engines that have an electrically-driven fan, including marine-based turbine engines, industrial turbine engines, and auxiliary power units. As shown in FIG. 1, the engine 10 has an axial centerline axis 12 that extends therethrough from an upstream end 98 of the engine 10 to a downstream end 99 of the engine 10 for reference purposes. In general, the engine 10 may include a fan assembly 14 and a core engine 16 disposed downstream from the fan assembly 14.

The core engine 16 may more generally be referred to herein as a drive mechanism, which may include, for example, a gas turbine engine or an electric motor. A gas turbine, however, will be described herein in more detail as constituting the core engine 16. The core engine 16 may generally include an outer casing 18 that defines an annular inlet 20. The outer casing 18 encases, or at least partially forms, in serial flow relationship, the core engine 16 having a compressor section (22/24) having a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage therebetween.

During operation of the engine 10, as shown in FIG. 1, a volume of air, as indicated schematically by arrows 50, enters the engine 10 from the upstream end 98 through an associated inlet duct 52 of the nacelle 44. As the air 50 passes across the fan blades 42, a portion of the air 50 is directed or routed into the bypass airflow passage 48 as a bypass airflow 54, while another portion of the air 50 is directed or routed into the annular inlet 20 and into the LP compressor 22 as a compressor inlet air 56. The compressor inlet air 56 is progressively compressed as it flows through the LP compressor 22 and the HP compressor 24 towards the combustor 26. Compressed air 58 flows into the combustor 26, where it is mixed with fuel and ignited to generate combustion gases 60. The combustion gases 60 flow into the HP turbine 28, thus causing the HP rotor shaft 34 to rotate, thereby supporting operation of the HP compressor 24. The combustion gases 60 are then routed through the LP turbine 30, thus causing the LP rotor shaft 36 to rotate, thereby supporting operation of the LP compressor 22 and/or rotation of the fan shaft 38. The combustion gases 60 are then exhausted through the jet exhaust nozzle section 32 of the core engine 16 to provide propulsion at the downstream end 99.

Figure 2:
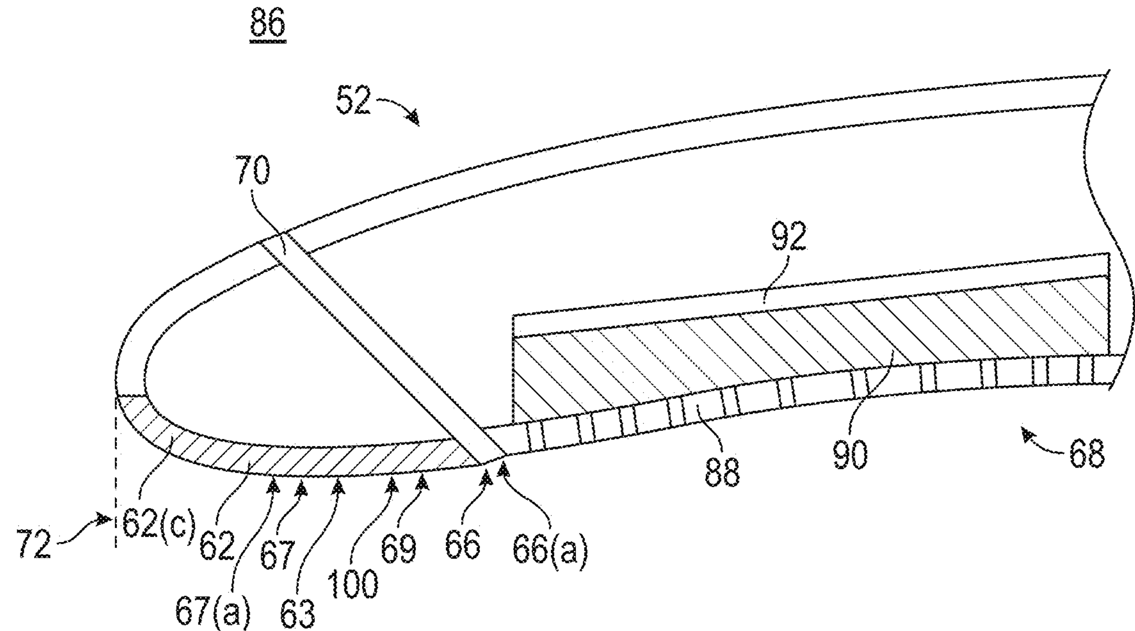
FIG. 2 is an enlarged partial cross-sectional view of a portion of an inlet duct taken at detail view 86 of FIG. 1, according to an aspect of the present disclosure.

The inlet duct 52 includes an inlet portion 53, such as an inlet lip 62, at an upstream end 76 of the inlet duct 52, a bulkhead or flange 70, and an acoustic liner 68 arranged downstream of the inlet lip 62. In one aspect, the inlet lip 62 (inlet portion 53) may constitute a hardwall surface 63 that is an impermeable hardwall surface 100 (FIG. 2), while the acoustic liner 68 may constitute, at least in part, a permeable surface. In an alternate aspect of FIG. 2, instead of the inlet lip 63 being an impermeable hardwall surface 100, the inlet lip 62 may constitute an acoustically treated inlet lip 62(*c*), such as a composite inlet lip that includes an acoustic treatment such as an acoustically permeable composite skin with an acoustic cellular core. The inlet duct 52 defines an inlet 78 extending in a circumferential direction (C) about an inlet centerline axis 80 and extends in an axial direction 136 along the inlet centerline axis 80. As shown in FIG. 1, the inlet centerline axis 80 may be angled at an angle 82 in a downward direction with respect to the engine axial centerline axis 12. The inlet lip 62 (inlet portion 53 having the hardwall surface 63 and the acoustic liner 68 may be coupled together at a hardwall-acoustic liner interface 66. Alternatively, in a case where the inlet lip 62 constitutes the acoustically treated inlet lip 62(*c*) (FIG. 2), the acoustically treated inlet lip 62(*c*) and the acoustic liner 68 may be coupled together at an inlet-acoustic liner interface 66(*a*) (FIG. 2). As used herein, the terms "inlet-acoustic liner interface" and "hardwall-acoustic liner interface" may be utilized interchangeably, and, in some instances, both refer to an interface between an inlet lip, which may or may not be a hardwall (i.e., impermeable) surface, and an acoustic liner. In some aspects described below, the hardwall surface 63 of the inlet lip 62 may vary axially and circumferentially about the inlet duct 52. The inlet lip 62 extends, along an inner circumferential surface 84 of the inlet duct 52, in the axial direction 136 along the inlet centerline axis 80 from a highlight 72 of the inlet duct 52 to the hardwall-acoustic liner interface 66, and the acoustic liner 68 extends from the hardwall-acoustic liner interface 66 to a fan section interface 74 (which may be referred to herein as a fan section-acoustic liner interface) of a fan section 75 of the nacelle 44. As will be described in more detail below, at least one of the inlet lip 62, the acoustic liner 68, and the hardwall-acoustic liner interface 66 are arranged to attenuate flutter bite of acoustic waves propagating through the inlet duct 52 by circumferentially altering a magnitude and a phase of a reflected acoustic wave propagating back through the inlet duct 52.

FIG. 2 is an enlarged partial cross-sectional view of a portion of the inlet duct 52 taken at detail view 86 of FIG. 1, according to an aspect of the present disclosure. As seen in FIG. 2, the inlet lip 62 may, in one aspect, comprise the hardwall surface 63 extending from the highlight 72 to the hardwall-acoustic liner interface 66. In an alternate aspect of FIG. 2 in which the inlet portion 53 constitutes the acoustically treated inlet lip 62(*c*) instead of the hardwall surface 63, the acoustically treated inlet lip 62(*c*) may extend from the highlight 72 to the inlet-acoustic liner interface 66(*a*). The acoustic liner 68 comprises a perforated surface panel 88, a sub-liner portion 90 (e.g., honeycomb-type sub-liner) that is connected (e.g., bonded) to the perforated surface panel 88, and a backside panel 92 that is bonded to the sub-liner portion 90. The inlet lip 62 and the acoustic liner 68 are joined together at the hardwall-acoustic liner interface 66.

Figure 3:
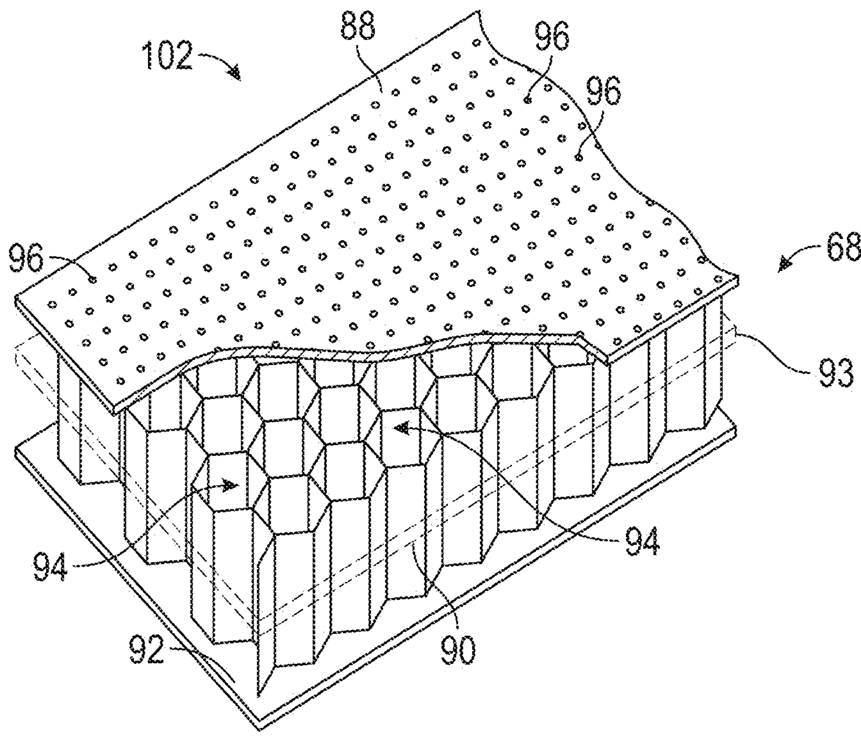
FIG. 3 is a perspective cut-away view of an exemplary acoustic liner, according to an aspect of the present disclosure.

FIG. 3 is a perspective cut-away view of an exemplary acoustic liner 68, according to an aspect of the present disclosure. The acoustic liner 68 depicted in FIG. 3 is generally referred to as a single degree of freedom (SDOF) acoustic liner, but the present disclosure may be implemented in other types of acoustic liners, including a double degree of freedom (DDOF) acoustic liner. For example, a septum layer 93, which may be permeable (i.e., include perforations) or impermeable, may be provided between the perforated surface panel 88 and the backside panel 92. In FIG. 3, the acoustic liner 68 may be referred to as a first type of acoustic liner 102. As seen in FIG. 3, the first type of acoustic liner 102 includes the perforated surface panel 88 having a plurality of perforations 96 therethrough. The sub-liner portion 90 includes a plurality of cavities 94 that may extend from the perforated surface panel 88 to the backside panel 92. The cavities 94 are in fluid communication with the inlet 78 (FIG. 1) via the plurality of perforations 96 such that the acoustic liner 68 may function as a quarter-wave resonator. As will be described in more detail below, an impedance of the acoustic liner 68 may be adjusted by, for example, filling in or eliminating (omitting) some of the perforations 96 of the perforated surface panel 88, by changing a size or a shape of the perforations 96 of the perforated surface panel 88, or by changing a height of the cavities 94 by filling in some of the cavities 94 of the sub-liner portion 90 with a filler or the like.

Figure 4:
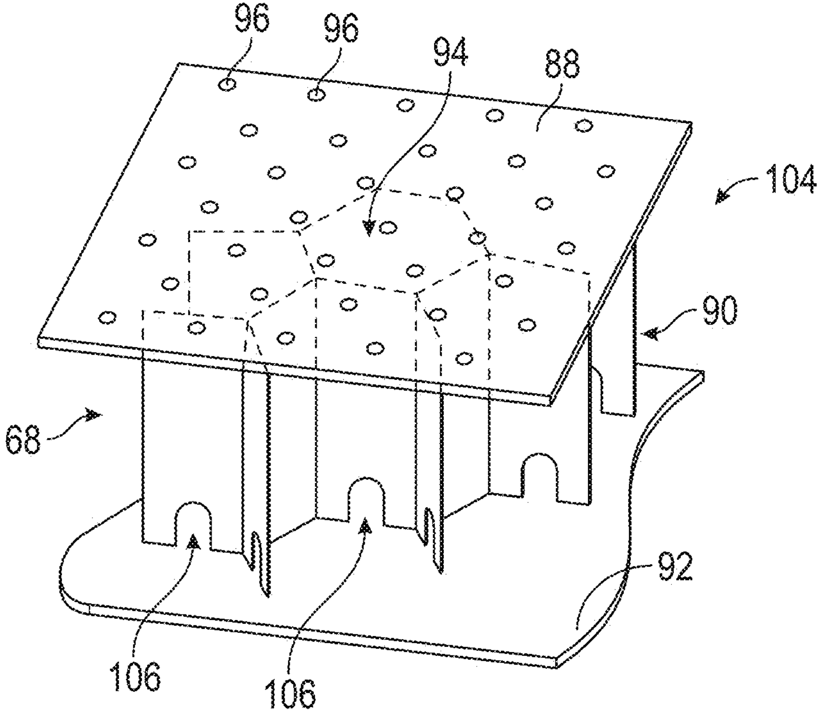
FIG. 4 is a perspective cut-away view of an exemplary acoustic liner, according to another aspect of the present disclosure.

FIG. 4 is a perspective cut-away view of an exemplary acoustic liner 68, according to another aspect of the present disclosure. The acoustic liner 68 depicted in FIG. 4 may be referred to as a second type of acoustic liner 104. The second type of acoustic liner 104 may be similar to the first type of acoustic liner 102 in that it also includes the perforated surface panel 88 having the plurality of perforations 96, the sub-liner portion 90 having the cavities 94, and the backside panel 92. In the FIG. 4 aspect, however, the sub-liner portion 90 includes drainage slots 106 at the connection between the sub-liner portion 90 and the backside panel 92. The second type of acoustic liner 104 may be implemented in a lower side 108 (FIG. 1) of the inlet duct 52 (FIG. 1) to allow moisture within the inlet duct 52 to drain from a drainage opening 110 (FIG. 1) of the inlet duct 52. As will be described below, the impedance of the acoustic liner 68 may also be changed by altering the size of the drainage slots 106 within respective ones of the sub-liner portions 90.

Figure 5:
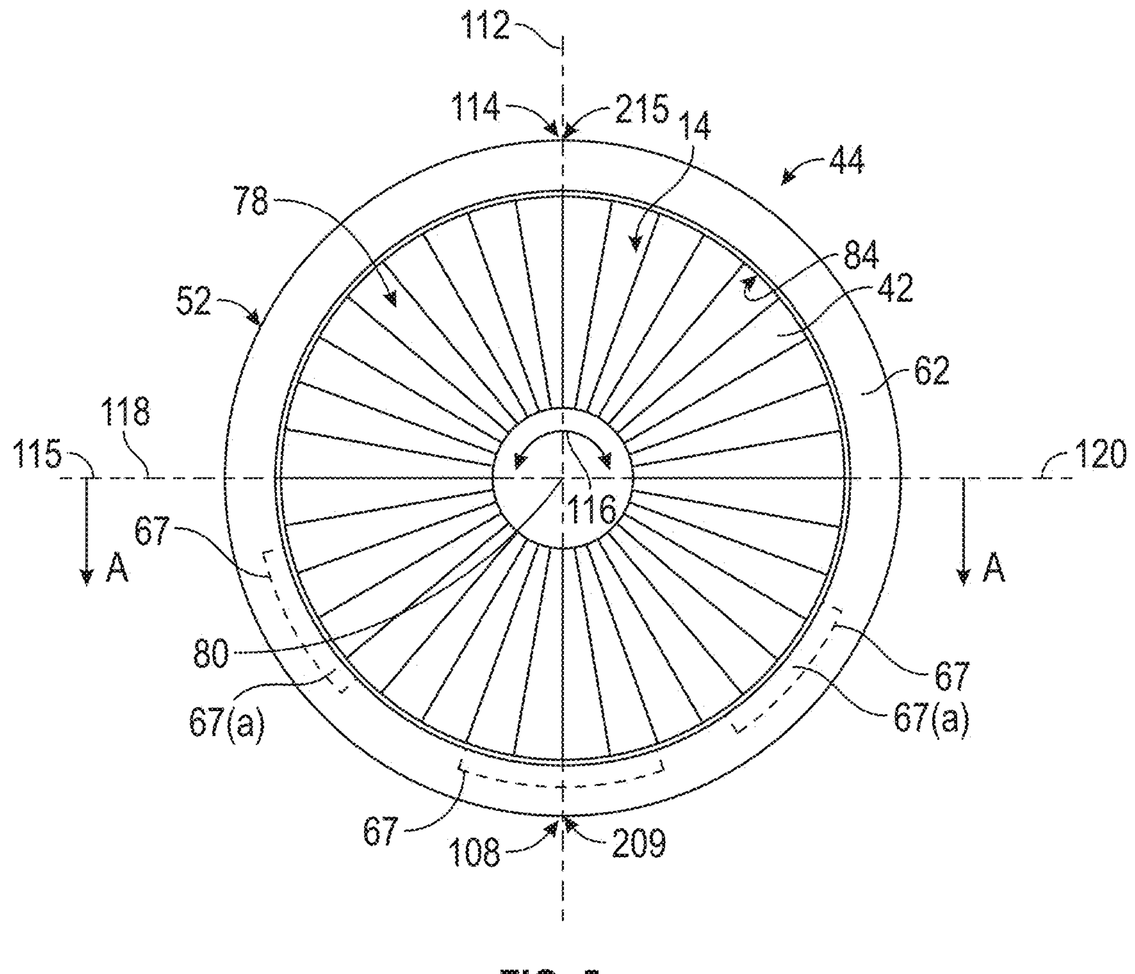
FIG. 5 is a forward aft-looking view of the engine of FIG. 1, taken at view 5-5, according to an aspect of the present disclosure.

FIG. 5 is a forward-aft-looking view of the engine of FIG. 1, taken at view 5-5, according to an aspect of the present disclosure. As shown in FIG. 5, the inlet duct 52 extends in a circumferential direction 116 about the inlet centerline axis 80. A vertical reference plane 112 is defined vertically through the inlet centerline axis 80 and extends along the inlet centerline axis 80. A horizontal reference plane 115 is orthogonal to the vertical reference plane 112 through the inlet centerline axis 80 and extends along the inlet centerline axis 80. The vertical reference plane 112 defines the lower side 108 of the inlet duct 52 and defines an upper side 114 of the inlet duct 52. The lower side 108 of the inlet duct 52 may be defined below the horizontal reference plane 115 and the upper side of the inlet duct 52 may be defined above the horizontal reference plane 115. The horizontal reference plane 115 includes a first side 118 extending horizontally from the inlet centerline axis 80 and a second side 120 extending horizontally from the inlet centerline axis 80.

Figure 6:
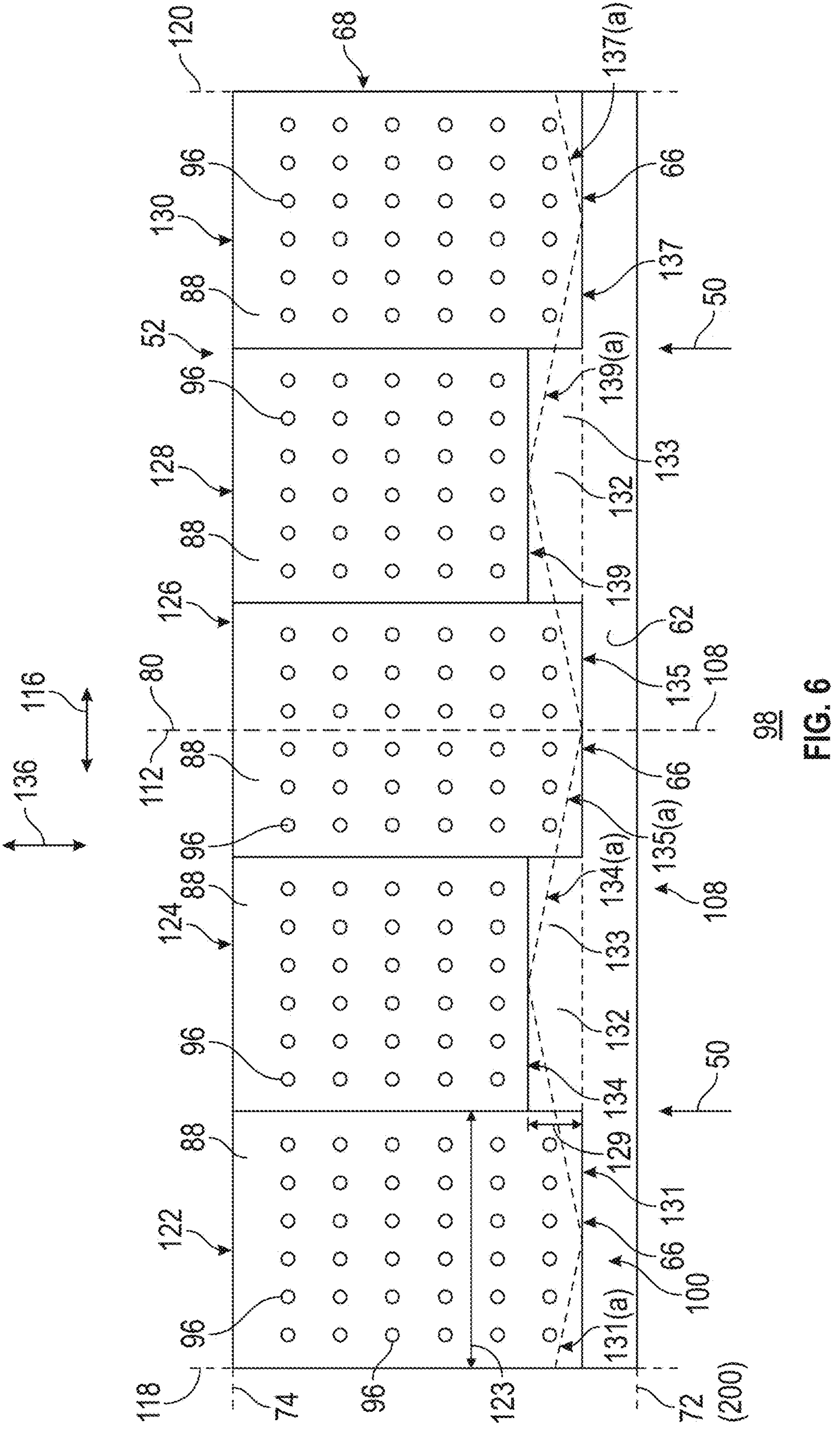
FIG. 6 is view of an inner circumferential surface of an inlet duct taken at A-A of FIG. 5, laid out as a plan view, according to an aspect of the present disclosure.

FIG. 6 is view of an inner circumferential surface of the inlet duct 52 taken at A-A of FIG. 5, laid out as a plan view, according to an aspect of the present disclosure. While FIG. 6 depicts a lower circumferential half of the inlet duct 52, the plan view layout depicted in FIG. 6 may also be applicable to any circumferential half of the inlet duct 52. As shown in FIG. 6, the acoustic liner 68 may include a plurality of acoustic liner sections, including a first acoustic liner section 122, a second acoustic liner section 124 arranged circumferentially adjacent to the first acoustic liner section 122, and a third acoustic liner section 126 arranged circumferentially adjacent to the second acoustic liner section 124. FIG. 6 also depicts a fourth acoustic liner section 128 arranged circumferentially adjacent to the third acoustic liner section 126, and a fifth acoustic liner section 130 arranged circumferentially adjacent to the fourth acoustic liner section 128. While the third acoustic liner section 126 may appear in FIG. 6 as being centered with respect to the lower side 108 and the vertical reference plane 112, this need not be the case and the third acoustic liner section 126 may be shifted in the circumferential direction 116 so as to be offset from the lower side 108 and the vertical reference plane 112. In addition, while each of the plurality of acoustic liner sections 122, 124, 126, 128, 130 depicted in FIG. 6 may appear to have an equal circumferential length 123, this also need not be the case and each respective acoustic liner section may have a different circumferential length 123 from the other acoustic liner sections.

Each of the first acoustic liner section 122, the second acoustic liner section 124, the third acoustic liner section 126, the fourth acoustic liner section 128, and the fifth acoustic liner section 130 may include the configuration of the first type of acoustic liner 102 (FIG. 3), or may include the configuration of the second type of acoustic liner 104 (FIG. 4). In the scenario where the second type of acoustic liner 104 with drainage slots is used, FIG. 6 would at least partly refer to a lower circumferential half of the nacelle 44 (FIG. 1). Alternatively, any combination of the first type of acoustic liner 102 and the second type of acoustic liner 104 may be implemented. For example, the second acoustic liner section 124, the third acoustic liner section 126, and the fourth acoustic liner section 128 may include the second type of acoustic liner 104, while the first acoustic liner section 122 and the fifth acoustic liner section 130 may include the first type of acoustic liner 102.

In FIG. 6, for the first acoustic liner section 122, a first hardwall-acoustic liner interface 131 is defined between the hardwall surface 100 of the inlet lip 62 and the first acoustic liner section 122. A similar arrangement is provided for the third acoustic liner section 126 so as to define a third hardwall-acoustic liner interface 135, and for the fifth acoustic liner section 130 so as to define a fifth hardwall-acoustic liner interface 137. On the other hand, for the second acoustic liner section 124, a second hardwall-acoustic liner interface 134 is defined between a hardwall surface 133 of a lip extension member 132 and the second acoustic liner section 124. The lip extension member 132 may extend an offset distance 129 in the axial direction 136 with respect to the first hardwall-acoustic liner interface 131. The offset distance 129 may be near the inlet lip 62, or may be offset a greater distance (e.g., halfway between the inlet lip 62 and the fan section interface 74), depending on the amount of change of the magnitude and the phase of the acoustic wave that is desired to be obtained. Similarly, a fourth hardwall-acoustic liner interface 139 is provided between a hardwall surface 133 of a lip extension member 132 for the fourth acoustic liner section 128. Thus, a square-wave pattern may be provided circumferentially for the hardwall-acoustic liner interface by the first hardwall-acoustic liner interface 131, the second hardwall-acoustic liner interface 134, the third hardwall-acoustic liner interface 135, the fourth hardwall-acoustic liner interface 139, and the fifth hardwall-acoustic liner interface 137 due to the axial offset in the axial direction 136 for each hardwall-acoustic liner interface of the respective acoustic liner sections. Of course, the hardwall-acoustic liner interface need not be in the form of a square wave pattern and may have other types of patterns instead. For example, the first acoustic liner section 122 may alternatively include a V-shaped first hardwall-acoustic liner interface 131 (*a*), and the second acoustic liner section 124 may include an inverted V-shaped second hardwall-acoustic liner interface 134 (*a*). The third acoustic liner section 126 may include a V-shaped third hardwall-acoustic liner interface 135 (*a*), the fourth acoustic liner section 128 may include an inverted V-shaped fourth hardwall-acoustic liner interface 139(*a*), and the fifth acoustic liner section 130 may include a V-shaped fifth hardwall-acoustic liner interface 137(*a*). Thus, a continuous hardwall-acoustic liner interface with an alternating V-shape and inverted V-shape may be included. As another example, as will be described below, the first acoustic liner section 122 and the second acoustic liner section 124 may form a sinusoidal pattern for the hardwall-acoustic liner interfaces. As a result, in any case, the staggered hardwall-acoustic liner interface circumferentially alters the magnitude and the phase of the reflected acoustic waves propagating back through the inlet 78 to reduce the likelihood of flutter bite.

Referring back to FIGS. 2 and 5, a similar effect to that provided by the FIG. 6 arrangement may be obtained by providing non-axisymmetric acoustic liner portions 67 to the acoustically treated inlet lip 62(*c*). In other words, when the acoustically treated inlet lip 62(*c*) is implemented as the inlet lip 62 rather than the inlet lip 62 constituting the hardwall surface 100, portions of the acoustically treated inlet lip 62(*c*), along an inner surface 69, may be covered by an impermeable surface or a perforated surface of the acoustically treated inlet lip 62(*c*) may be covered with a tape, adhesive, etc. that blocks the acoustic liner functionality locally. This impermeable surface may be located in the same areas as that shown in FIG. 5 for the non-axisymmetric acoustic liner portions 67 so as to define a non-axisymmetric lip liner 67(*a*).

Figure 7:
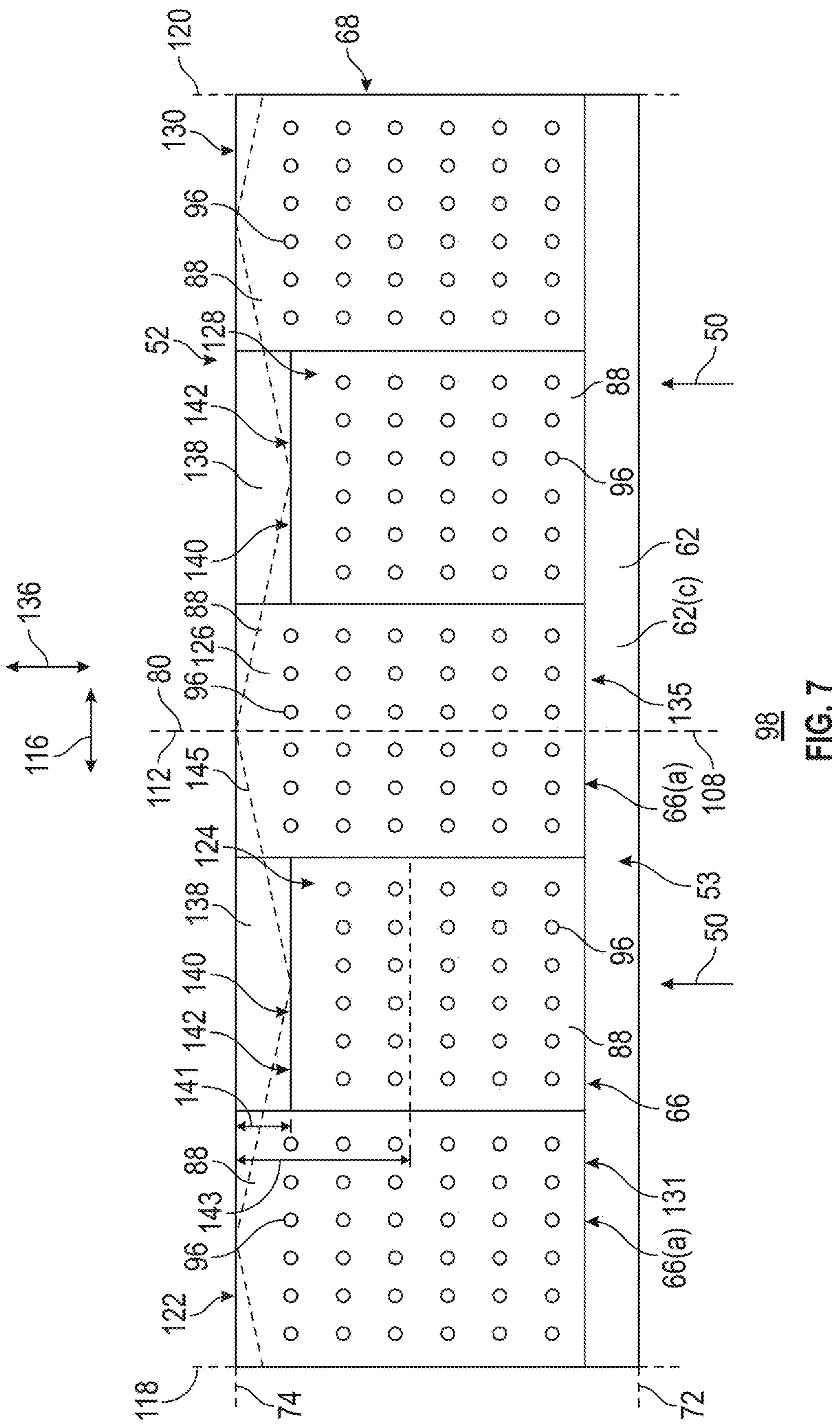
FIG. 7 is view of an inner circumferential surface of an inlet duct similar to FIG. 6, laid out as a plan view, according to an aspect of the present disclosure.

FIG. 7 is view of an inner circumferential surface of an inlet duct 52 similar to FIG. 6, laid out as a plan view, according to another aspect of the present disclosure. The FIG. 7 aspect is similar to the FIG. 6 aspect. However, in the FIG. 7 aspect, rather than implementing the lip extension member 132 in the second acoustic liner section 124 and in the fourth acoustic liner section 128, a fan section hardwall surface 138 is provided at a downstream side 140 of the second acoustic liner section 124 upstream of the fan section interface 74. In addition, the inlet portion 53 (inlet lip 62) in FIG. 7 may constitute the acoustically treated inlet lip 62(*c*) such that the hardwall-acoustic liner interface 66 constitutes the inlet-acoustic liner interface 66(*a*). Thus, for the second acoustic liner section 124 and the fourth acoustic liner section 128, each includes a fan section hardwall-acoustic liner interface 142. The fan section hardwall-acoustic liner interface 142 may be arranged an offset distance 141 near the fan section interface 74, or may be arranged a greater offset distance 143 (e.g., halfway between the fan section interface 74 and the inlet-acoustic liner interface 66(*a*)) from the fan section interface 74. As such, the magnitude and the phase of reflected acoustic waves propagating back through the inlet 78 can be altered by the staggered fan section hardwall-acoustic liner interfaces 142. Again, while FIG. 7 depicts the lower side 108 of the inlet duct 52, a similar staggered arrangement may be implemented in any circumferential sector of the inlet duct 52. In addition, while FIG. 7 may depict a square wave pattern for the fan section hardwall-acoustic liner interface 142 adjacent to the fan section interface 74, similar to the FIG. 6 aspect, an alternating V-shape/inverted V-shape fan section hardwall-acoustic liner interface 145, or a sinusoidally varying fan section hardwall-acoustic liner interface may be provided instead.

Figure 8:
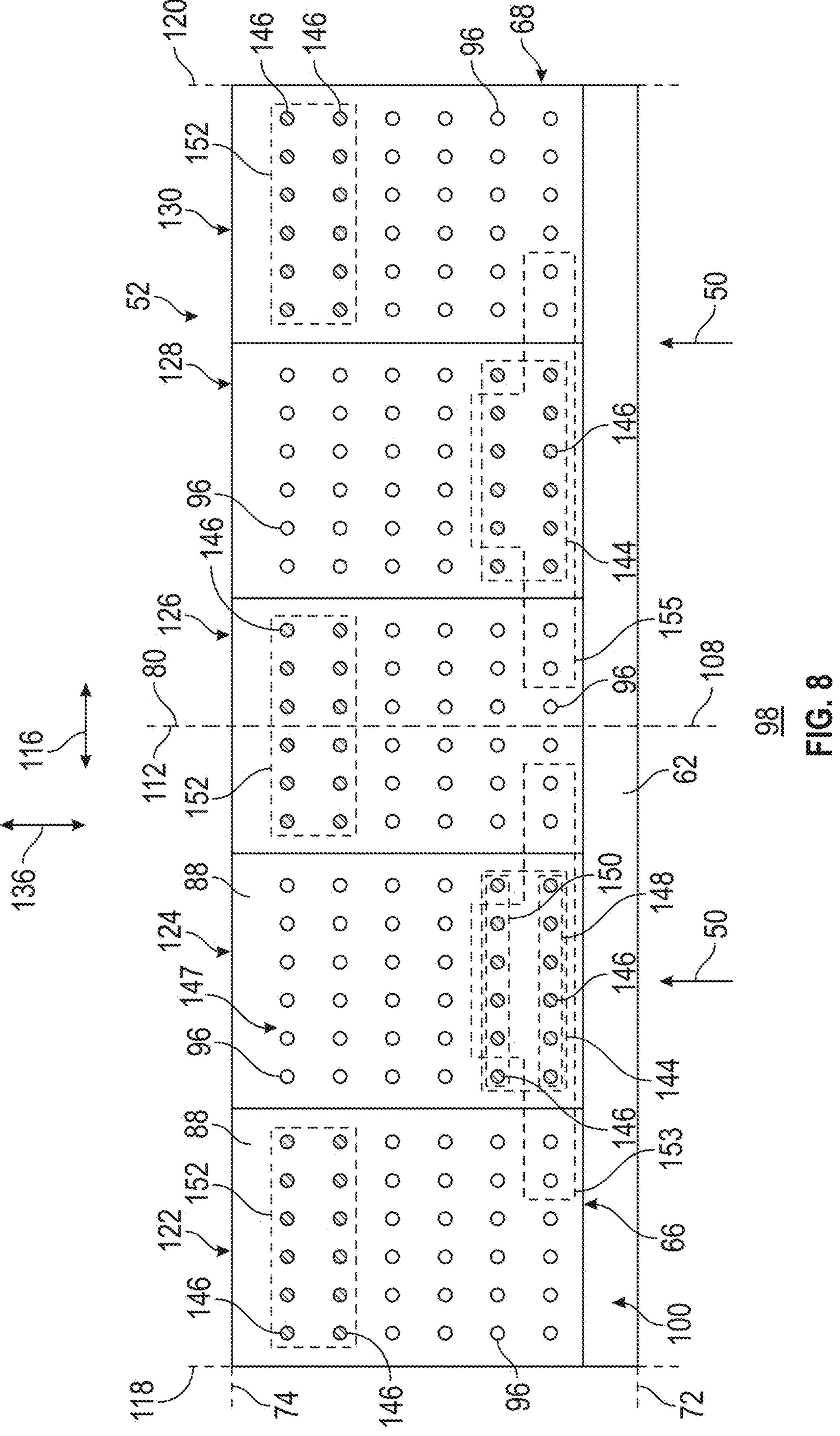
FIG. 8 is view of an inner circumferential surface of an inlet duct similar to FIG. 6, laid out as a plan view, according to an aspect of the present disclosure.

FIG. 8 is view of an inner circumferential surface of an inlet duct 52 similar to FIG. 6, laid out as a plan view, according to yet another aspect of the present disclosure. The FIG. 8 aspect, however, omits the lip extension members 132, and instead of utilizing the staggered hardwall-acoustic liner interface to alter the magnitude and the phase of the reflecting acoustic wave, the magnitude and the phase of the reflecting acoustic wave is altered by changing an impedance of the acoustic liner. More specifically, the impedance of the acoustic liner 68 may be changed by altering a pattern of the perforations 96 in the perforated surface panel 88 between respective acoustic liner sections 122, 124, 126, 128, 130. As shown in FIG. 8, for the second acoustic liner section 124, a first group 144 of the perforations 96 may be covered or filled so as to form blocked perforations 146, while the remaining perforations in the second acoustic liner section 124 downstream of the first group 144 may constitute a second group 147 of unblocked perforations 96. The blocked perforations 146 may also merely constitute omitted perforations (i.e., an area in which a perforation is omitted or has a size of zero). In FIG. 8, the number of perforations 96 shown with respect to each cavity 94 is merely a general representation of perforations, and as shown in more detail in FIGS. 3 and 4, the number of perforations 96 provided for each cavity 94 is generally at least three perforations 96 for each cavity 94. Thus, the number of blocked perforations 146 per cavity 94 may be greater than the number of blocked perforations 146 shown in FIG. 8. The blocked perforations 146 may constitute the perforations 96 being filled with a filler material, such as a metal having a composite bonding agent, or by being covered with, for example, an adhesive sheet (e.g., tape) or a metal sheet. Alternatively, the perforated surface panel 88 may be formed with the perforations 96 being omitted from an area of the perforated surface panel 88 defined by the first group 144.

Furthermore, instead of filling or covering the perforations 96, the perforated surface panel 88 may alternatively be formed with the perforations 96 being designed with different shapes, sizes, spacing and/or with different net porosity so as to alter the acoustic impedance relative to that from an area of the perforated surface panel 88 defined by the second group 147. In the FIG. 8 aspect, a first row 148 of the blocked perforations 146 may be adjacent to the hardwall-acoustic liner interface 66, while a second row 150 of the blocked perforations 146 may be downstream of the first row 148. Of course, additional rows of the perforations 96 could also be blocked perforations 146 and could be included within the first group 144. As shown in FIG. 8, the fourth acoustic liner section 128 may also include the first group 144 of the blocked perforations 146. Thus, with implementing the blocked perforations 146 in the second acoustic liner section 124 and in the fourth acoustic liner section 128, a similar pattern to the square wave pattern of the hardwall-acoustic liner interface in FIG. 6 may be provided. As a result, by altering the impedance of the acoustic liner 68 between different acoustic liner sections, the magnitude and the phase of the reflecting acoustic waves can be altered.

In addition, or alternatively, the blocked perforations 146 may be provided at other axial locations along the length of the acoustic liner 68, or may be provided with a different pattern than that of the square wave pattern. For instance, as one example shown with regard to the first acoustic liner section 122, blocked perforations 146 may be provided adjacent to the fan section interface 74 instead of adjacent to the hardwall-acoustic liner interface 66. As shown in FIG. 8, the first acoustic liner section 122 may include a second group 152 of the blocked perforations 146, where the second group 152 may be similar to the first group 144 of the blocked perforations 146. However, the second group 152 may be located downstream of the hardwall-acoustic liner interface 66, and may be arranged adjacent to the fan section interface 74 instead. Of course, a group of the blocked perforations 146 may be provided at any axial location between the hardwall-acoustic liner interface 66 and the fan section interface 74.

Alternatively, blocked perforations 146 may be arranged adjacent to the hardwall-acoustic liner interface 66 so as to resemble the V-shaped/inverted V-shaped hardwall-acoustic liner interface as depicted in FIG. 6. For example, a first group 153 of blocked perforations 146 may be included across the first acoustic liner section 122, the second acoustic liner section 124, and a portion of the third acoustic liner section 126 so as to simulate a V-shape, and a second group 155 of the blocked perforations 146 may be included across a portion of the third acoustic liner section 126, the fourth acoustic liner section 128, and the fifth acoustic liner section 130 so as to simulate a V-shape. As another example, the blocked perforations 146 may be arranged adjacent to the hardwall-acoustic liner interface 66 so as to form a sinusoidal pattern for the hardwall-acoustic liner interface 66. Thus, in all cases, the first group 144 and the second group 152 may be configured to have different impedance values, and the various patterns of the blocked perforations 146 provide for changing the impedance of the acoustic liner 68, thereby altering the magnitude and the phase of the reflected acoustic wave so as to reduce flutter bite.

Still further, rather than implementing blocked perforations 146, the perforations 96 may be implemented with different sizes or different shapes. For example, in the second acoustic liner section 124, the blocked perforations 146 may, instead of being blocked, have a different size and/or a different shape than the remaining perforations 96 within the second acoustic liner section 124. Similarly, in the third acoustic liner section 126, the blocked perforations 146 may, instead of being blocked, have a different size and/or a different shape than the remaining perforations 96 within the third acoustic liner section 126. As a result, the different sized or different shaped perforations may change the impedance of the acoustic liner so as to alter the magnitude and the phase of the reflected acoustic wave.

Figure 9:
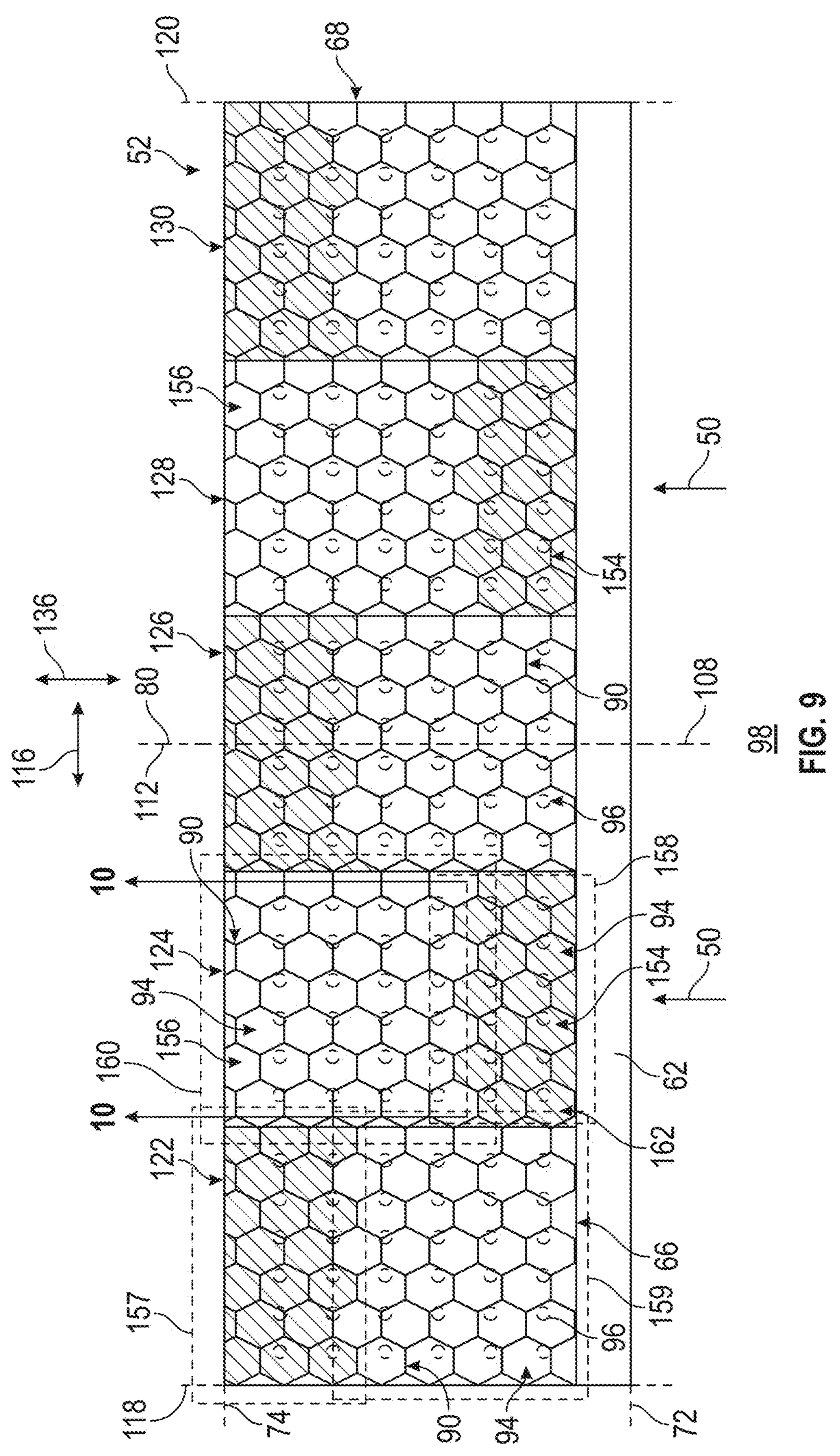
FIG. 9 is view of an inner circumferential surface of an inlet duct similar to FIG. 8, laid out as a plan view and with the perforated surface panel removed, according to an aspect of the present disclosure.

FIG. 9 is view of an inner circumferential surface of an inlet duct 52 similar to FIG. 8, laid out as a plan view and with the perforated surface panel 88 removed, according to an aspect of the present disclosure. As shown in FIG. 9, the perforated surface panel 88 has been removed to reveal the sub-liner portion 90 for each of the first acoustic liner section 122, the second acoustic liner section 124, the third acoustic liner section 126, the fourth acoustic liner section 128, and the fifth acoustic liner section 130. For reference purposes only, locations of the plurality of perforations 96 as they may appear through the perforated surface panel 88 if it were installed are shown with hidden lines. The reference perforations 96 shown in FIG. 9, however, do not necessarily correspond to the number of perforations 96 or to the size of the perforations 96 that may be implemented in the surface panel 88, and the size and the number of perforations 96 may be different from that shown in FIG. 9. Similar to the FIG. 8 aspect, the FIG. 9 aspect aims to alter/change the impedance of the acoustic liner 68, but in a different manner than that of the FIG. 8 aspect. As was described above with regard to FIGS. 3 and 4, the sub-liner portion 90 includes the plurality of cavities 94. In FIG. 9, referring to the second acoustic liner section 124, the plurality of cavities may be arranged in a first group 154 of cavities (shown as being darkened) and a second group 156 of cavities (shown as being light). The first group 154 includes a plurality of the cavities 94 arranged in an array 158 that includes a plurality of the cavities 94 arranged adjacent to one another in the axial direction 136 and a plurality of the cavities 94 arranged adjacent to one another in the circumferential direction 116. The second group 156 includes a plurality of the cavities 94 arranged in an array 160 that includes a plurality of the cavities 94 arranged adjacent to one another in the axial direction 136 and a plurality of the cavities 94 arranged adjacent to one another in the circumferential direction 116. The first group 154 of the second acoustic liner section 124 is shown as being arranged adjacent to the hardwall-acoustic liner interface 66 and extending downstream therefrom. Thus, the first group 154 may be considered to be arranged at a predetermined axial position from the hardwall-acoustic liner interface 66, where the predetermined axial position for the first group 154 in the second acoustic liner section 124 is adjacent to the hardwall-acoustic liner interface 66. On the other hand, the second group 156 of the cavities 94 may constitute the remaining cavities 94 in the second acoustic liner section 124 and the second group 156 extends from the downstream side of the first group 154 to the fan section interface 74. A similar arrangement of the first group 154 and the second group 156 of the plurality of cavities 94 may be included in the fourth acoustic liner section 128.

Figure 10:
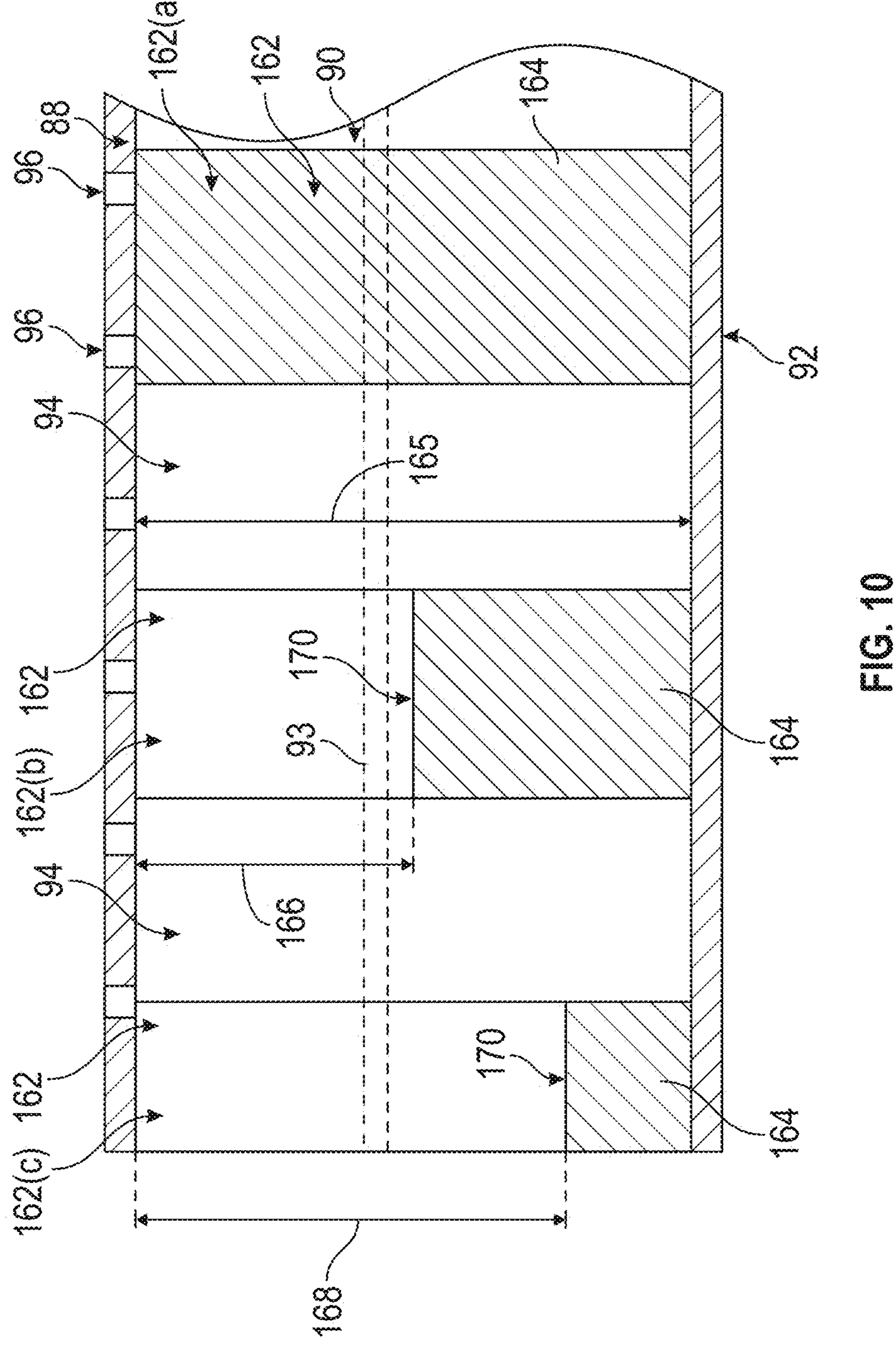
FIG. 10 is a partial cross-sectional view through the second acoustic liner section 124 taken at plane 10-10 of FIG. 9, according to an aspect of the present disclosure.

FIG. 10 is a partial cross-sectional view through the second acoustic liner section 124 taken at plane 10-10 of FIG. 9. For altering/changing the impedance of the acoustic liner 68, and, in particular, in altering/changing the impedance of the second acoustic liner section 124, a volume of the respective cavities 94 in the different groups may be altered by, for example, changing a depth of the cavities 94, or including different sized or different shaped cavities among the different groups. As one example, the impedance may be changed by altering a depth of the cavities 94 such that the plurality of cavities 94 in the first group 154 (FIG. 9) may be filled-in with a filler material 164, such as a resin or other filler material, such that they are configured as filled-in cavities 162 to have a depth that is less than a depth of the cavities 94 of the second group 156 (FIG. 9). For example, as shown in FIG. 10, a first filled-in cavity 162(*a*) may be filled-in completely between the backside panel 92 and the perforated surface panel 88 with the filler material 164. Thus, as compared with the cavities 94 of the second group 156, the first filled-in cavity 162(*a*) of the first group 154 has a first depth (which is zero for the completely filled-in cavity 162(*a*)) that is less than a second depth 165 of the cavities 94 in the second group 156. Alternatively, the filled-in cavities 162 may be partially filled-in, such as a second filled-in cavity 162(*b*) that may be filled-in with the filler material 164 about halfway between the backside panel 92 and the perforated surface panel 88. Thus, the second filled-in cavity 162(*b*) is shown to have a third depth 166 from the perforated surface panel 88 to a surface 170 of the filler material 164 that is less than the second depth 165. Still, alternatively, the filled-in cavities 162 may be partially filled-in about one-quarter of the distance between the backside panel 92 and the perforated surface panel 88 such that a third filled-in cavity 162(*c*) may have a fourth depth 168 from the perforated surface panel 88 to the surface 170 of the filler material 164. In one aspect, each of the filled-in cavities 162 of the first group 154 may be filled-in to have the same first depth, or alternatively, the depth of each individual filled-in cavity 162 in the first group 154 may be different from other filled-in cavities 162, thereby providing greater flexibility to tune the impedance of the acoustic liner 68.

Referring still to FIG. 10, as another alternative to the filled-in cavities 162, as was stated above with regard to FIG. 3, a double degree of freedom (DDOF) acoustic liner may be implemented as the acoustic liner 68, where the double degree of freedom acoustic liner includes the septum layer 93. The septum layer 93 is arranged between the perforated surface panel 88 and the backside panel 92, thereby forming a second layer so as to alter the acoustic response of the cavities 94. In obtaining a configuration similar to the filled-in cavities 162 of FIG. 9, the septum layer 93 may be impermeable, thereby altering the depth of the cavities 94 so as to correspond to the filled-in cavities 162. Alternatively, the septum layer 93 may be permeable and include perforations similar to the perforations 96 of the perforated surface panel 88, thereby altering the acoustic response of the cavities 94.

Referring back to FIG. 9, in a similar manner to that of FIG. 8 in which the first acoustic liner section 122 includes the second group 152 of blocked perforations 146 adjacent to the fan section interface 74, the first acoustic liner section 122 in FIG. 9 may include a first group 157 of the plurality of cavities 94 arranged adjacent to the fan section interface 74 and a second group 159 of the plurality of cavities 94 as the remaining cavities within the first acoustic liner section 122. The first group 157 may constitute the filled cavities 162, while the second group 159 may include the unfilled cavities 94. The third acoustic liner section 126 and the fifth acoustic liner section 130 may include a similar arrangement. Thus, the impedance of the acoustic liner 68 may be arranged via the filled cavities 162 so as to alter the magnitude and the phase of the reflected acoustic waves.

Figure 11:
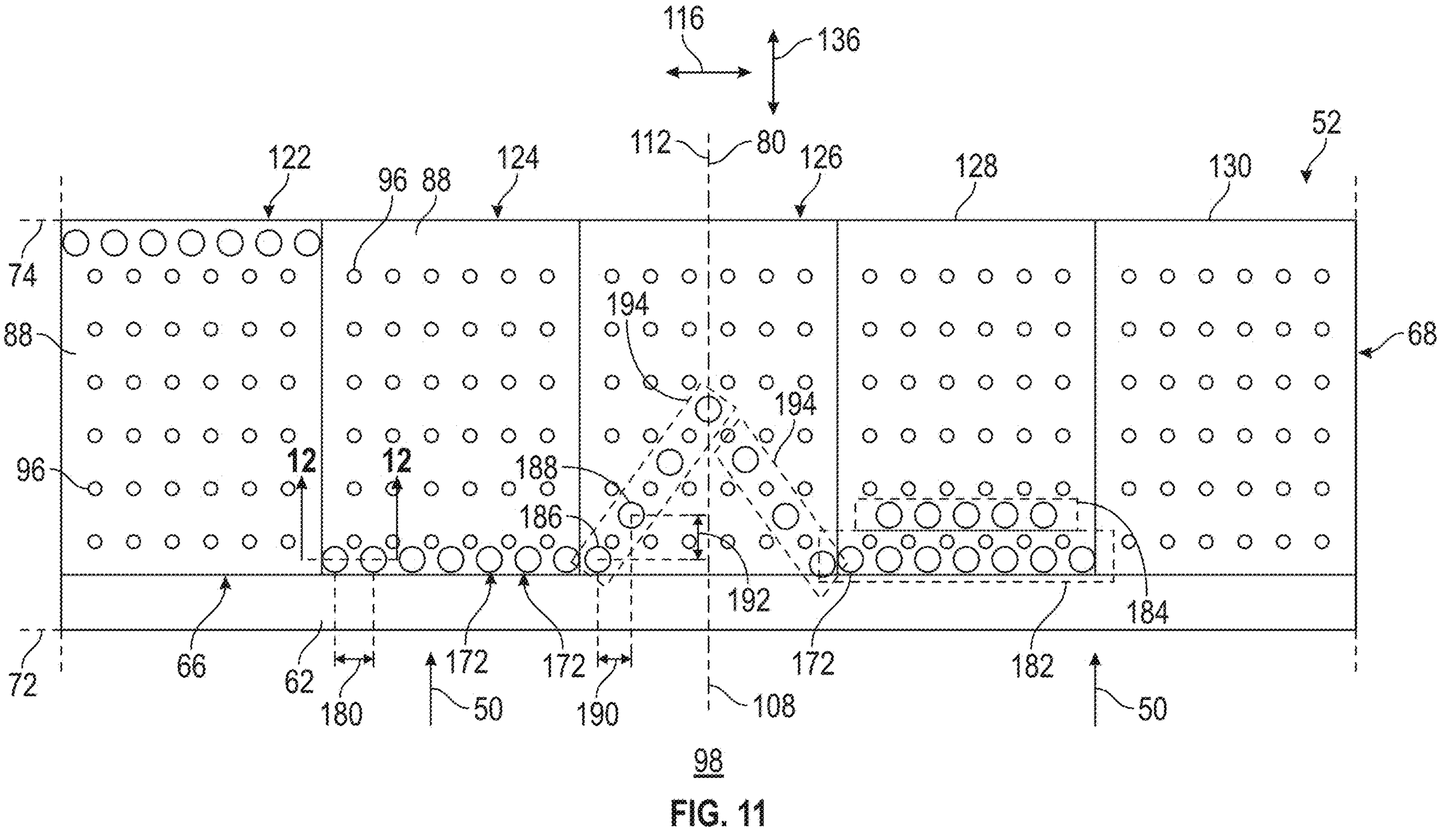
FIG. 11 is view of an inner circumferential surface of an inlet duct similar to FIG. 6, laid out as a plan view, according to another aspect of the present disclosure.
Figure 12:
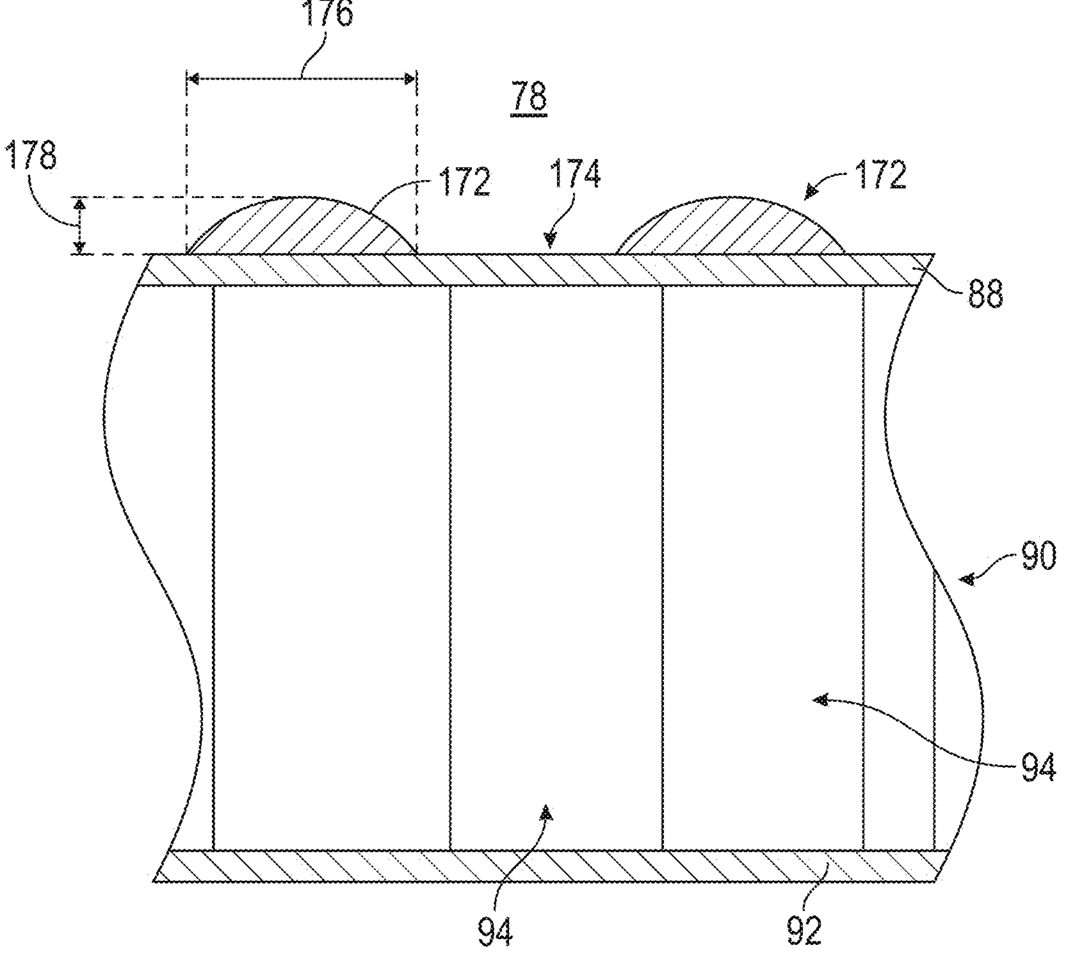
FIG. 12 is a partial cross-sectional view taken at plane 12-12 of FIG. 11, according to an aspect of the present disclosure.

FIG. 11 is view of an inner circumferential surface of an inlet duct 52 similar to FIG. 6, laid out as a plan view, according to an aspect of the present disclosure. The FIG. 11 aspect includes the acoustic liner 68 similar to that shown in any of FIG. 3 or 4, but without the lip extension member 132 providing an extension of the hardwall-acoustic liner interface 66. In the FIG. 11 aspect, a plurality of projections 172 may be provided on a surface of the perforated surface panel 88 in order to alter the magnitude and the phase of the reflected acoustic waves. FIG. 12 is a partial cross-sectional view taken at plane 12-12 of FIG. 11. As seen in FIG. 12, the plurality of projections 172 may be dome shaped projections extending from a surface 174 of the perforated surface panel 88 into the inlet 78 of the inlet duct 52 (FIG. 11). Of course, any other type of projection besides a dome shaped projection may be implemented instead. As shown in FIG. 12, the projections 172 may be configured to have a width 176 and a height 178, which each may be dependent upon a desired alteration of the magnitude and the phase of the reflected acoustic wave through the inlet duct 52. The projections 172 may be bonded to the perforated surface panel 88, or may be formed integral with (i.e., as one continuous structure) the perforated surface panel 88.

Referring back to FIG. 11, various alignments and axial locations of the projections 172 may be implemented. In one implementation as shown with regard to the second acoustic liner section 124, the plurality of projections 172 may be arranged adjacent to the hardwall-acoustic liner interface 66, and may be arranged adjacent to one another spaced apart in a single row along the circumferential direction 116. A circumferential spacing 180 between the projections 172 may also be dependent upon a desired alteration of the magnitude and the phase of the reflected acoustic wave through the inlet duct 52. As one alternative implementation shown with regard to the first acoustic liner section 122, the plurality of projections 172 may be arranged in a single row adjacent to the fan section interface 74 instead of adjacent to the hardwall-acoustic liner interface 66. Of course, the single row may be implemented in the axial direction 136 anywhere between that shown in the first acoustic liner section 122 and the second acoustic liner section 124, and more than one row may be implemented axially within the same acoustic liner section.

In another alternative implementation shown with regard to the fourth acoustic liner section 128, more than one row of the projections 172 may be included in the axial direction adjacent to one another, including a first row 182 of the projections 172 arranged adjacent to the hardwall-acoustic liner interface 66 and a second row 184 of the projections 172 arranged downstream in the axial direction 136 of the first row 182. Of course, more than two rows of the projections 172 may be included instead.

In yet another alternative implementation shown with regard to the third acoustic liner section 126, the projections 172 may be arranged angularly offset from one another both circumferentially and axially. For example, a first projection 186 of the projections 172 and a second projection 188 of the projections 172 may be offset from one another with a circumferential offset 190 and may be axially offset from one another with an axial offset 192. Additional projections 172 may be included and be both circumferentially and axially offset along the surface 174 of the perforated surface panel 88 so as to form an angular array 194 of the projections 172. Multiples of angular arrays 194 can be arranged to form a V-shaped array of projections distributed circumferentially along the acoustic liner 68. More general patterns (e.g., sinusoidal wave shaped) of arrays of projections can also be formed to provide a similar beneficial effect. Of course, more than one single angularly arranged array 194 may be implemented within the same acoustic liner section, and any combination of the foregoing implementations may be provided in the acoustic liner sections.

Figure 13:
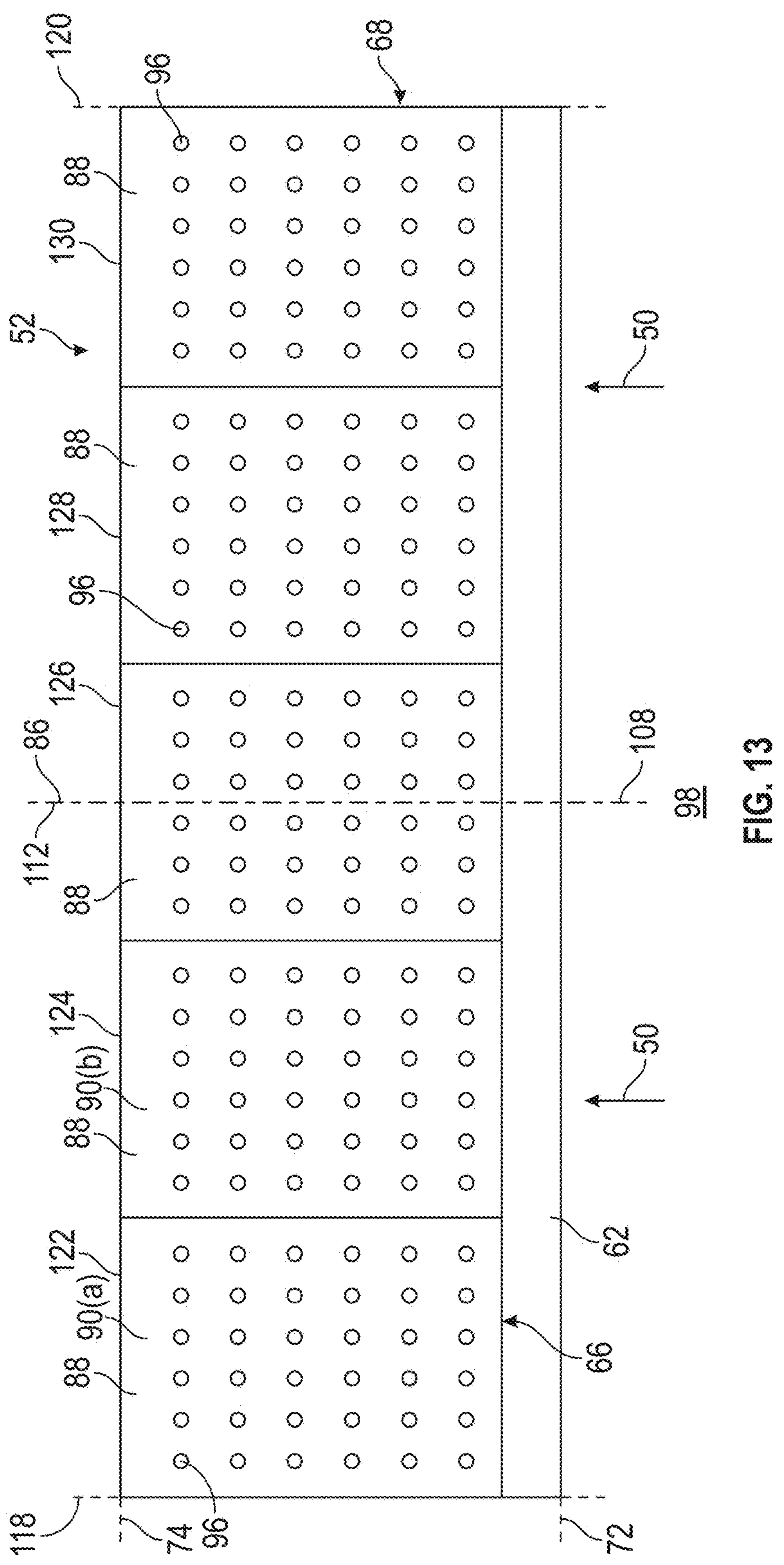
FIG. 13 is view of a bottom side circumferential surface of an inlet duct similar to FIG. 6, laid out as a plan view, according to an aspect of the present disclosure.

FIG. 13 is view of a bottom inner circumferential surface side of an inlet duct 52 similar to FIG. 6, laid out as a plan view, according to an aspect of the present disclosure. The FIG. 13 aspect aims to alter the impedance of the acoustic liner 68 and omits the lip extension members 132. In the FIG. 13 aspect, the impedance of the acoustic liner 68 may be altered/changed by implementing different types of sub-liner portions 90 for each of the first acoustic liner section 122, the second acoustic liner section 124, the third acoustic liner section 126, the fourth acoustic liner section 128, and the fifth acoustic liner section 130. More particularly, each of the first acoustic liner section 122, the second acoustic liner section 124, the third acoustic liner section 126, the fourth acoustic liner section 128, and the fifth acoustic liner section 130 may implement the sub-liner portion 90 having the drainage slots 106 as shown in FIG. 4. However, to alter the phase of the reflected acoustic wave, the drainage slots 106 in the respective acoustic liner sections may be altered to be different from one another. For example, the first acoustic liner section 122 may include a first sub-liner portion 90(*a*), and the second acoustic liner section 124 may include a second sub-liner portion 90(*b*).

Figure 14:
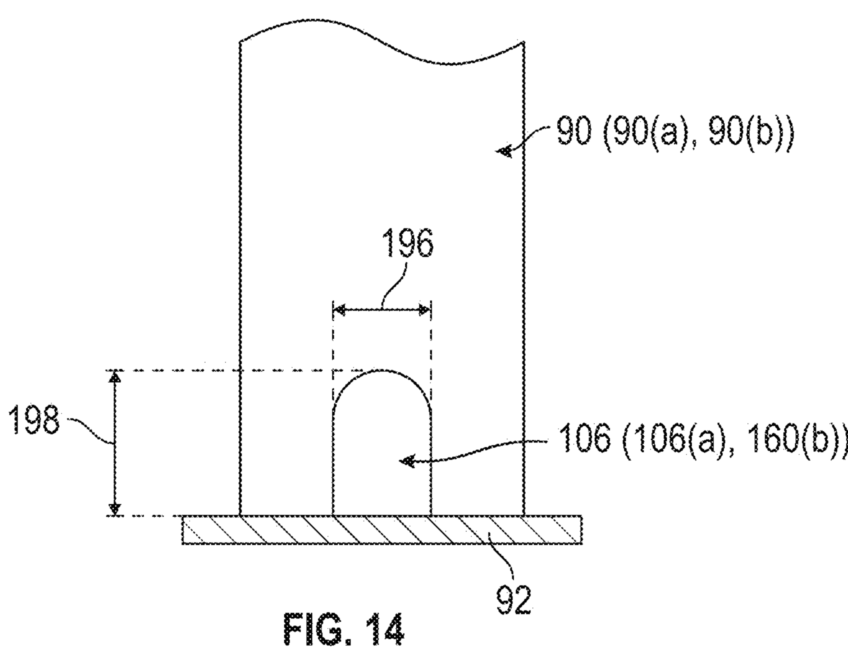
FIG. 14 depicts an exemplary drainage slot as shown in FIG. 4, according to an aspect of the present disclosure.

Referring to FIG. 14, an exemplary drainage slot 106 as shown in FIG. 4 is depicted therein. As shown, the drainage slot 106 may have a slot width 196 and a slot height 198. For the first acoustic liner section 122 (FIG. 13), the first sub-liner portion 90(*a*) may have a first type of drainage slots 106(*a*) with a first slot width for the slot width 196 and a first slot height for the slot height 198, while, for the second acoustic liner section 124 (FIG. 13), the second sub-liner portion 90(*b*) may have a second type of drainage slots 106(*b*) with a second slot width for the slot width 196 that is different from the first slot width 196 (i.e., either less than the first slot width, or greater than the first slot width) and may have a second slot height for the slot height 198 different from the first slot height 198 (i.e., either less than the first slot height or greater than the first slot height). Slot widths 196 and slot heights 198 of the various drainage slots 106 within the sub-liner portion 90 of each individual acoustic liner section may also be varied with respect to one another. Additionally, the drainage slots 106 of the third acoustic liner section 126 (FIG. 13), the fourth acoustic liner section 128 (FIG. 13), and the fifth acoustic liner section 130 (FIG. 13) may also be varied with respect to one another and within each respective acoustic liner section. Thus, by providing different size drainage slots 106 in the respective acoustic liner sections, the impedance of the acoustic liner 68 can be altered/changed so as to change the magnitude and phase of the reflecting acoustic wave passing through the inlet duct 52.

In the following description of FIG. 15 to FIG. 23, the magnitude and phase of the reflecting acoustic wave is changed by varying the hardwall-acoustic liner interface 66 both circumferentially and axially with a smooth transition about the inner circumferential surface 84 of the inlet duct 52. In some of the following aspects, the highlight 72 extends circumferentially about the inlet centerline axis 80 and defines a highlight plane 200 that is generally orthogonal to the inlet centerline axis 80, and the hardwall-acoustic liner interface 66 may vary axially and circumferentially with respect to the highlight plane 200. In other aspects described below, the inlet lip 62 (inlet portion 53) may vary circumferentially and axially (i.e., the highlight plane 200 may be arranged at a scarf angle, or may be a highlight curve 200(*a*) (FIGS. 18, 19) rather than a highlight plane 200 and may be a highlight curve 200(*a*) arranged with multiple offsets axially and circumferentially (FIGS. 21, 22)) and the hardwall-acoustic liner interface 66 may parallel the axially and circumferentially varying inlet lip 62. Alternatively the hardwall-acoustic liner interface 66 may be formed independent of the inlet lip 62, such as a constant axial position to simplify manufacturing, or provide for a different circumferential variation relative to the inlet lip 62 so as to further improve the acoustic response of the inlet and liner configuration.

Figure 15:
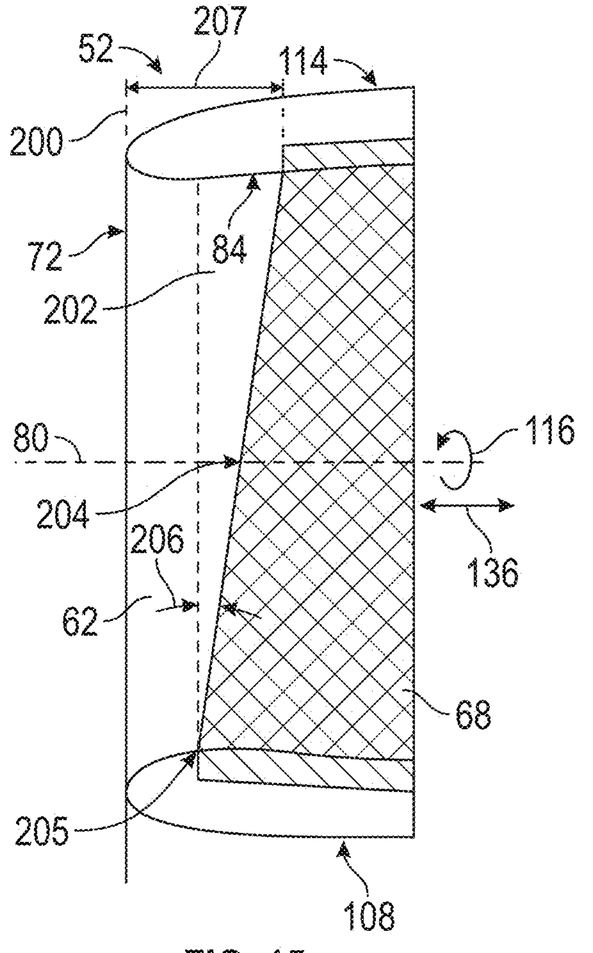
FIG. 15 is a partial cross-sectional side view of an inlet duct having an axially and circumferentially varying hard-wall-acoustic liner interface, according to an aspect of the present disclosure.
Figure 16:
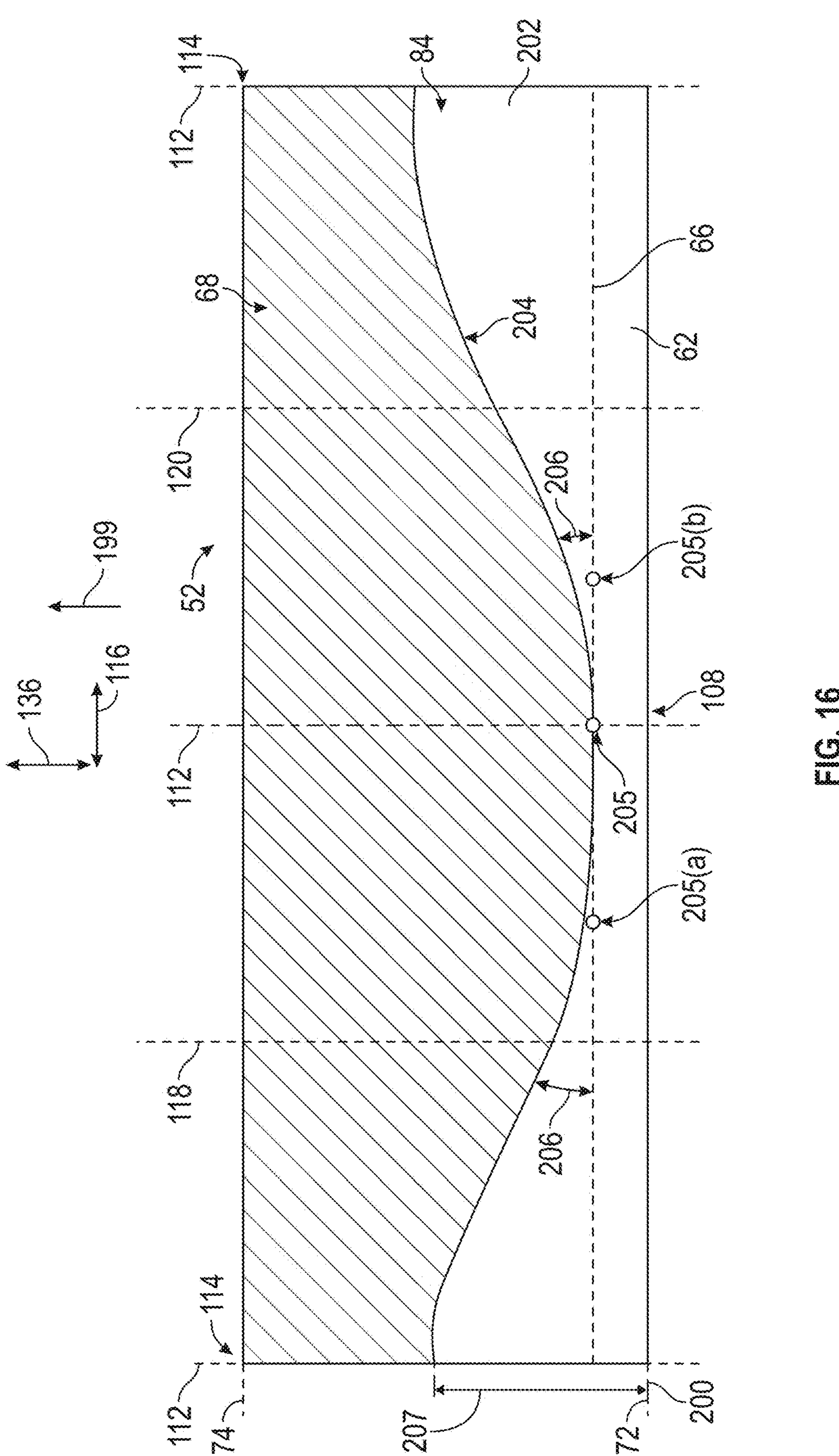
FIG. 16 depicts an inner circumferential surface of the inlet duct, laid out in a plan view, depicting the acoustic liner of the FIG. 15 aspect according to the present disclosure.
Figure 17:
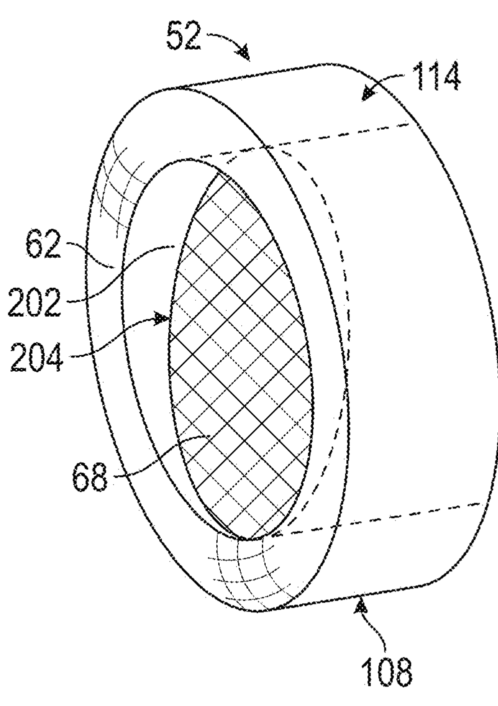
FIG. 17 is a perspective view of an inlet duct having an axially and circumferentially varying hardwall-acoustic liner interface of the FIG. 15 aspect according to an aspect of the present disclosure.

FIG. 15 is a partial cross-sectional side view of the inlet duct 52 having an axially and circumferentially varying hardwall-acoustic liner interface 204, according to an aspect of the present disclosure. FIG. 16 depicts the inner circumferential surface 84 of the inlet duct 52, laid out in a plan view, depicting the acoustic liner 68 of the FIG. 15 aspect according to the present disclosure. FIG. 17 is a perspective view of the inlet duct 52 depicting the acoustic liner 68 of the FIG. 15 aspect according to an aspect of the present disclosure. Referring collectively to FIGS. 15 to 17, the inlet duct 52 further includes a hardwall portion 202 arranged between the inlet lip 62 and the acoustic liner 68. A hardwall-acoustic liner interface 204 is defined between the hardwall portion 202 and the acoustic liner 68. The hardwall-acoustic liner interface 204 extends circumferentially and axially about the inner circumferential surface 84 in the circumferential direction 116 and in the axial direction 136, and may be arranged at an angle 206 in a downstream direction 199 with respect to the highlight plane 200. In the axial direction 136, the hardwall-acoustic liner interface 204 may be offset an axial offset distance 207 from the highlight plane 200. Circumferentially, in FIG. 16, an apex 205 (or forward-most point of the hardwall-acoustic liner interface 204) is depicted as being aligned with the lower side 108, but the arrangement of FIG. 16 is not limited to the foregoing and the entire hardwall-acoustic liner interface 204 may be shifted circumferentially to, for example, an apex 205(*a*) or to an apex 205(*b*), or to any other circumferential location of an apex about the inner circumferential surface 84. The term "apex" is intended to mean a mid-point along a transitional portion between two converging lines. Thus, when the transitional portion of the converging lines may from a V-shaped transition, the apex refers to the point of convergence between the two lines. On the other hand, when the transitional portion between two converging lines is formed by a curved transition, the apex refers to a peak of the curved transition portion between the two converging lines.

Figure 18:
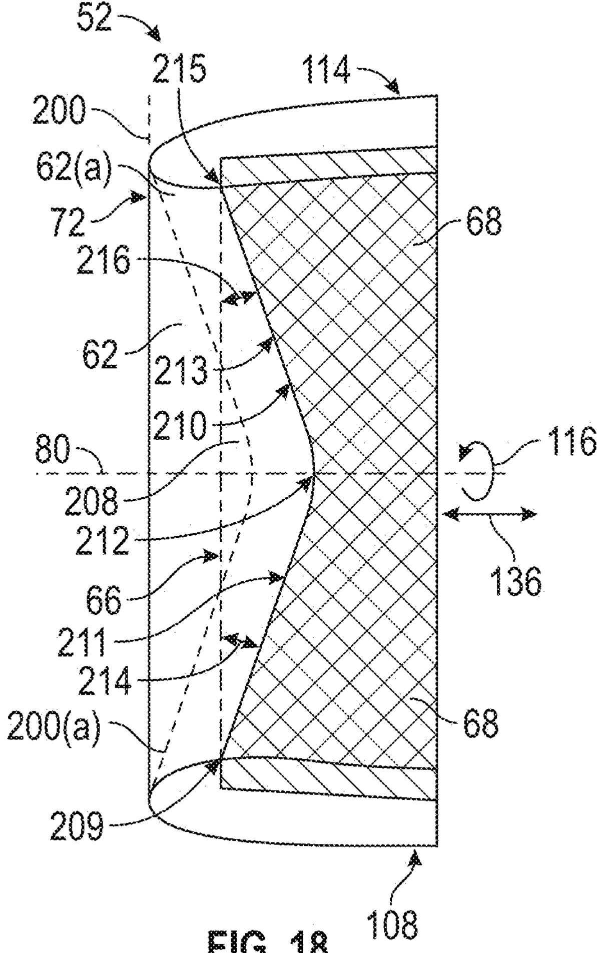
FIG. 18 is a partial cross-sectional side view of an inlet duct having an axially and circumferentially varying hard-wall-acoustic liner interface, according to another aspect of the present disclosure.
Figure 19:
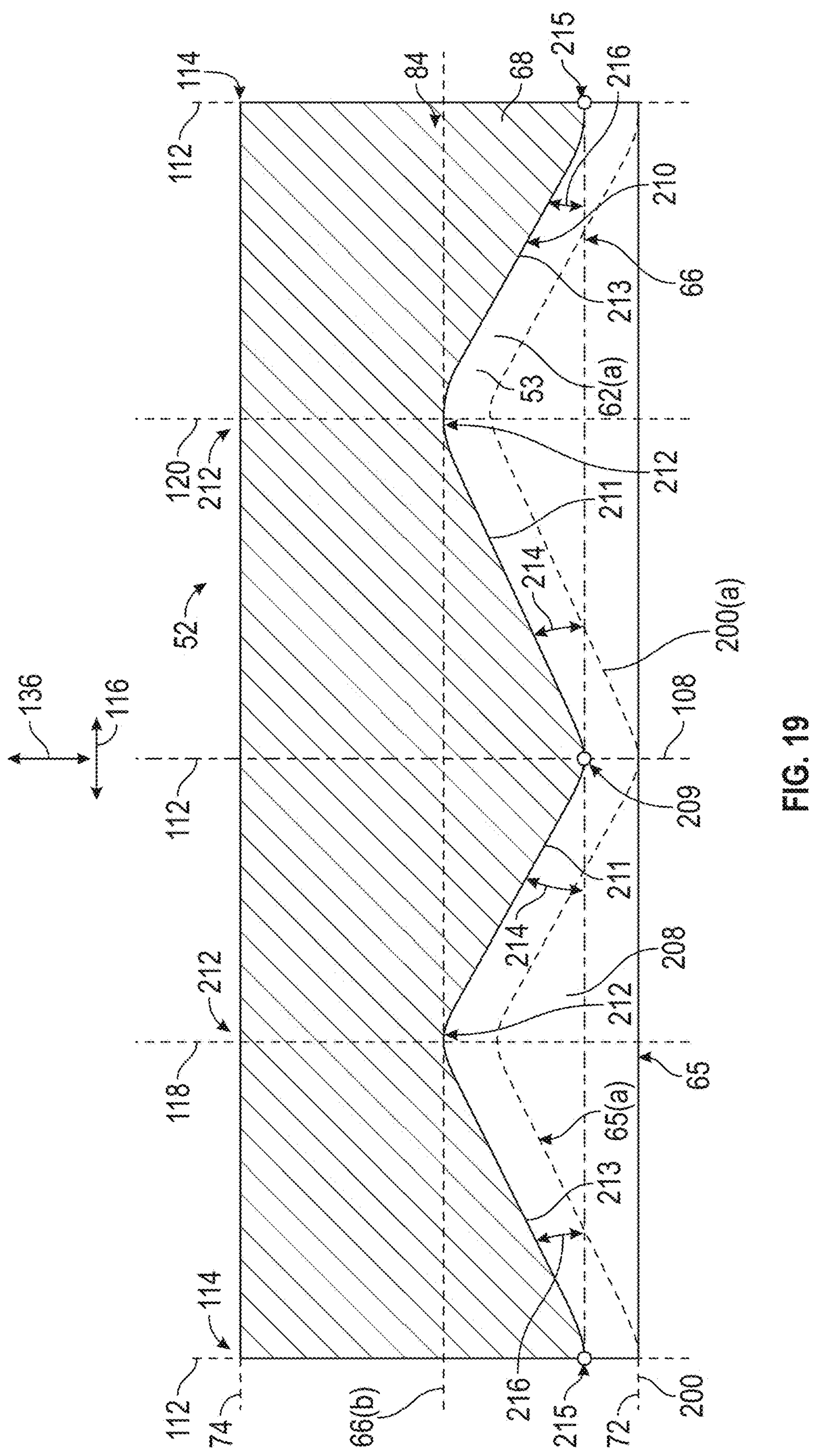
FIG. 19 depicts an inner circumferential surface of the inlet duct, laid out in a plan view, depicting the acoustic liner of the FIG. 18 aspect according to the present disclosure.
Figure 20:
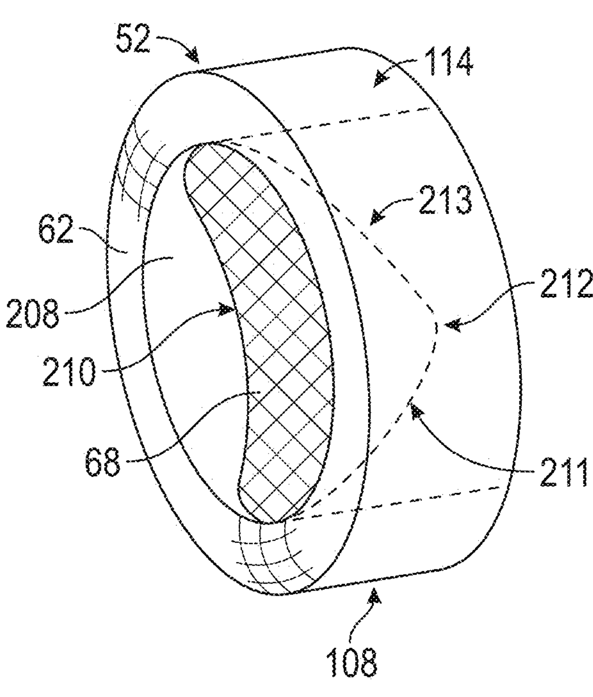
FIG. 20 is a perspective view of an inlet duct depicting the acoustic liner of the FIG. 18 aspect according to an aspect of the present disclosure.

FIG. 18 is a partial cross-sectional side view of the inlet duct 52 having an axially and circumferentially varying hardwall-acoustic liner interface, according to another aspect of the present disclosure. FIG. 19 depicts the inner circumferential surface 84 of the inlet duct 52, laid out in a plan view, depicting the acoustic liner 68 of the FIG. 18 aspect according to the present disclosure. FIG. 20 is a perspective view of the inlet duct 52 depicting the acoustic liner 68 of the FIG. 18 aspect according to an aspect of the present disclosure. The aspect depicted in FIGS. 18 to 20 may generally correspond to an inlet duct in which the inlet lip, and/or the hardwall-acoustic liner interface, includes two cutaway sections about the circumference of the inlet duct. Referring collectively to FIGS. 18 to 20, the inlet duct 52 further includes a hardwall portion 208 arranged between the inlet lip 62 and the acoustic liner 68. An axially and circumferentially varying hardwall-acoustic liner interface 210 is defined between the hardwall portion 208 and the acoustic liner 68. In one implementation, the hardwall-acoustic liner interface 210 extends and varies circumferentially and axially about the inner circumferential surface 84 in the circumferential direction 116 and in the axial direction 136 with respect to a forward portion 65 of the inlet lip 62. The hardwall-acoustic liner interface 210 includes a first portion 211, which may be on the lower side 108 of the inlet duct 52, extending in the circumferential direction 116 and in the axial direction 136 downstream from an apex 209 to the lower side 108 of the inlet duct 52 to a mid-portion 212 of the inlet duct 52 at a first cutaway angle 214. The hardwall-acoustic liner interface 210 also includes a second portion 213 on the upper side 114 of the inlet duct 52 extending in the circumferential direction 116 and in the axial direction 136 downstream from an apex 215 at the upper side 114 of the inlet duct 52 to the mid-portion 212 of the inlet duct 52 at a second cutaway angle 216. The first cutaway angle 214 and the second cutaway angle 216 may be similar or inverted angles such that the hardwall-acoustic liner interface 210 generally defines a curved waveform shape (e.g., a V-shaped waveform) extending circumferentially and axially with respect to the forward portion 65 of the inlet duct 52. In another aspect, the first cutaway angle 214 and the second cutaway angle 216 may be different angles such that the hardwall-acoustic liner interface 210 defines a waveform-shaped interface (i.e., an offset V-shaped waveform interface) circumferentially about the inlet duct 52. In another aspect, a sinusoidal waveform shaped hardwall-acoustic liner interface 210 may be provided, where the first cutaway angle 214 and the second cutaway angle 216 are continuously varying circumferentially along the sinusoidal waveform shaped hardwall-acoustic liner interface 210. While FIG. 19 depicts the apex 209 being aligned circumferentially with the lower side 108 and the apex 215 being aligned circumferentially with the upper side 114, each of the apex 209 and the apex 215 may be shifted circumferentially to either side of the lower side 108 and the upper side 114, or arbitrarily clocked circumferentially, instead.

In an alternative implementation, inlet lip 62 may also vary circumferentially and axially. For example, instead of the forward portion 65 of the inlet lip 62 being generally aligned parallel to the highlight plane 200 about the entire circumference of the inlet lip 62, the inlet lip 62 may be an inlet lip 62(*a*) in which a forward portion 65(*a*) of the inlet lip 62(*a*) is generally parallel with the circumferentially varying (e.g., sinusoidal or waveform-shaped) hardwall-acoustic liner interface 210. That is, the inlet lip 62(*a*) varies circumferentially and axially in the same circumferentially varying pattern. While the hardwall-acoustic liner interface 210 is shown as being parallel to the circumferentially and axially varying inlet lip 62(*a*), as an alternative, a hardwall-acoustic liner interface 66(*b*) that may be axially constant may be implemented with the circumferentially and axially varying inlet lip 62(*a*). That is, the hardwall-acoustic liner interface 66(*b*) may be arranged at a constant axial distance with respect to the highlight plane 200, while the inlet lip 62(*a*) varies circumferentially and axially.

Figure 21:
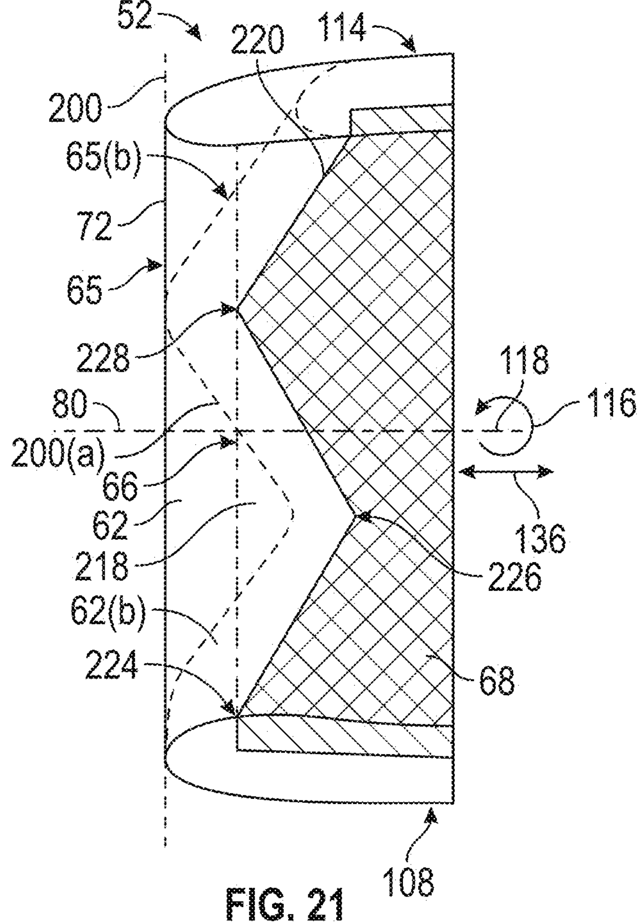
FIG. 21 is a partial cross-sectional side view of an inlet duct having an axially and circumferentially varying hard-wall-acoustic liner interface, according to another aspect of the present disclosure.
Figure 22:
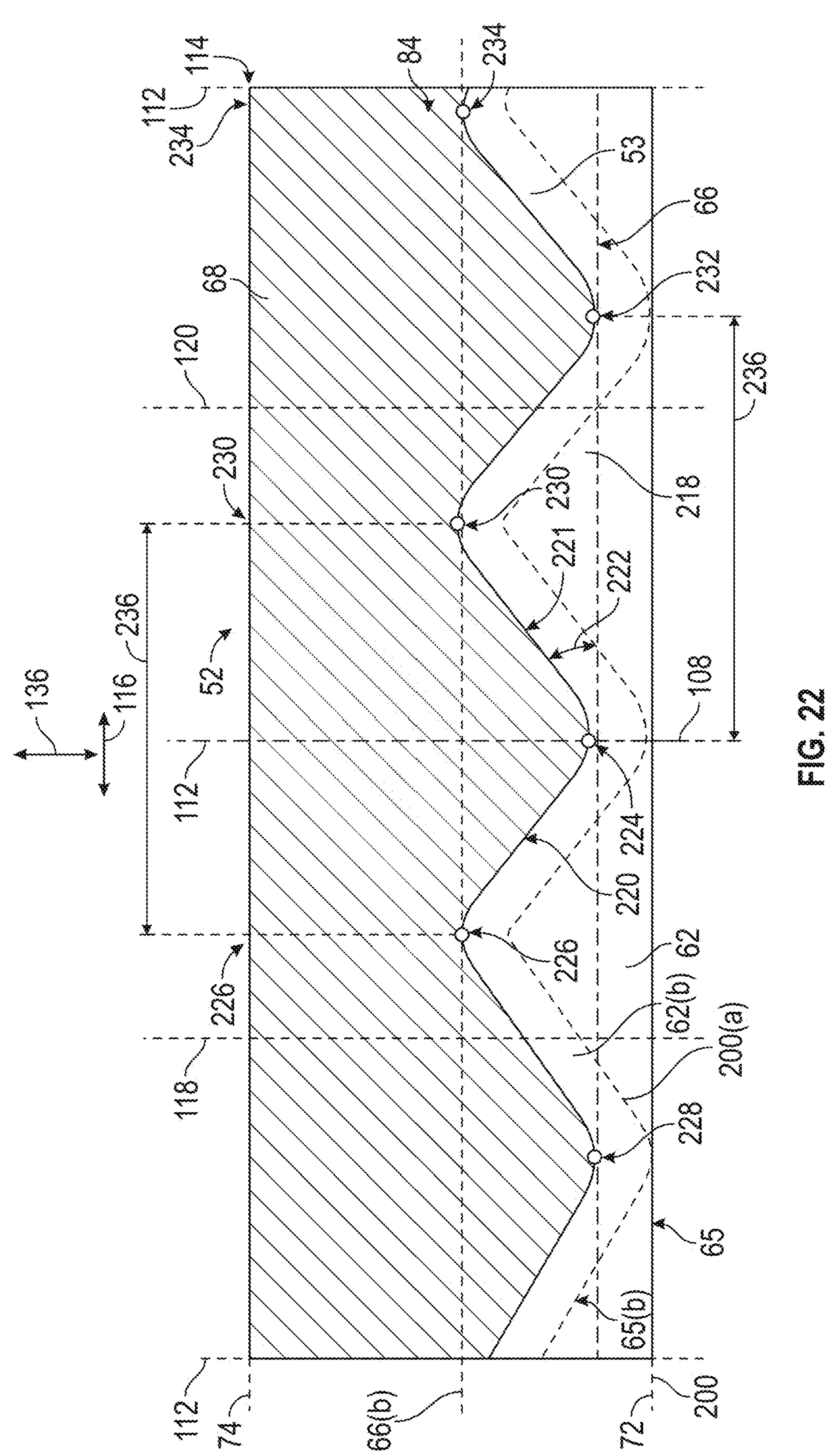
FIG. 22 depicts an inner circumferential surface of the inlet duct, laid out in a plan view, depicting the acoustic liner of the FIG. 21 aspect according to the present disclosure.
Figure 23:
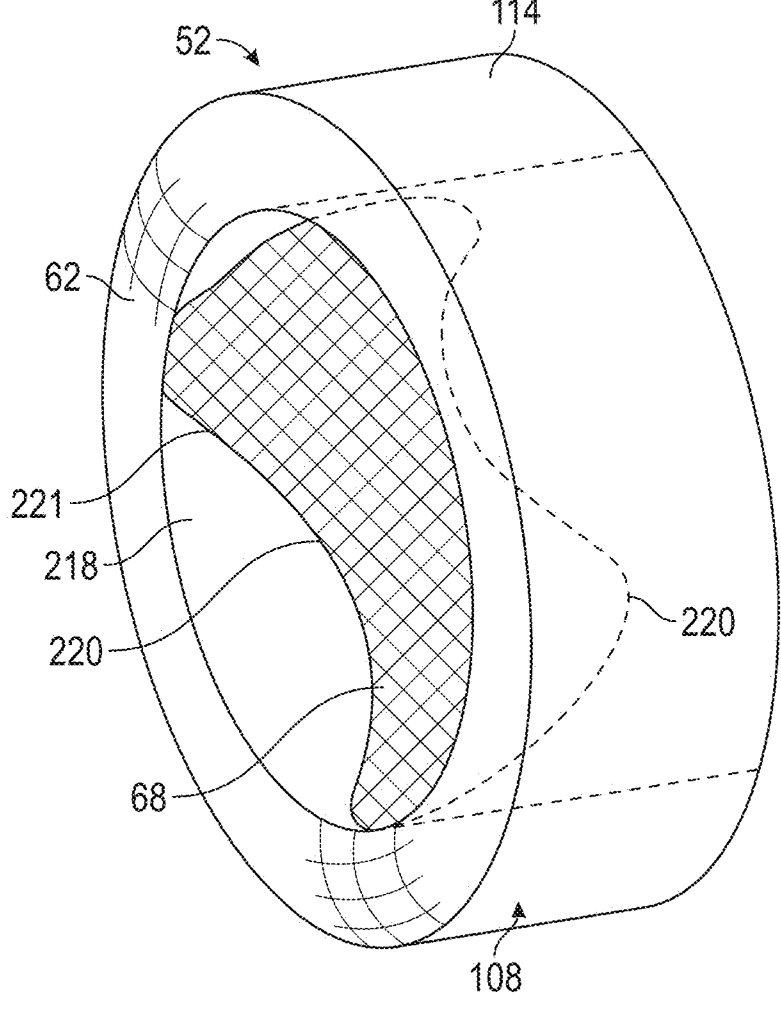
FIG. 23 is a perspective view of an inlet duct depicting the acoustic liner of the FIG. 21 aspect according to an aspect of the present disclosure.

FIG. 21 is a partial cross-sectional side view of the inlet duct 52 depicting an acoustic liner 68, according to another aspect of the present disclosure. FIG. 22 depicts the inner circumferential surface 84 of the inlet duct 52, laid out in a plan view, depicting the acoustic liner 68 of the FIG. 21 aspect according to the present disclosure. FIG. 23 is a perspective view of the inlet duct 52 depicting the acoustic liner 68 of the FIG. 21 aspect according to an aspect of the present disclosure. The aspect depicted in FIGS. 21 to 23 may generally correspond to an inlet duct in which the inlet lip, and/or the hardwall-acoustic liner interface, includes three cutaway shaped sections about the circumference of the inlet duct. Referring collectively to FIGS. 21 to 23, the inlet duct 52 further includes a hardwall portion 218 arranged between the inlet lip 62 and the acoustic liner 68. An axially and circumferentially varying hardwall-acoustic liner interface 220 is defined between the hardwall portion 218 and the acoustic liner 68. In one implementation, the hardwall-acoustic liner interface 220 extends and varies circumferentially and axially about the inner circumferential surface 84 in the circumferential direction 116 and in the axial direction 136 with respect to a forward portion 65 of the inlet lip 62. The hardwall-acoustic liner interface 220 is arranged as a circumferentially varying or waveform-shaped hardwall-acoustic liner interface 221 about the inner circumferential surface 84 of the inlet duct. The hardwall-acoustic liner interface 220 may be a V-shaped waveform shape, a sinusoidal waveform shape, or any waveform-type shape that includes a non-repeating frequency circumferentially. In the present aspect of FIGS. 21 to 23, the waveform-shaped hardwall-acoustic liner interface 221 is shown to include three forward apexes arranged adjacent to the inlet lip 62, including a first forward apex 224, a second forward apex 228, and a third forward apex 232, and three aft apexes arranged adjacent to the fan section interface 74, including a first aft apex 226, a second aft apex 230, and a third aft apex 234. With the three forward apexes and the three aft apexes, when the three forward apexes are arranged equidistant from each other, a circumferential phase 236 between the forward apexes and between the aft apexes may be one-hundred-twenty degrees. The forward apexes, however, may also be arranged at non-equidistant phase angles from one another such that the phase angle between apexes may be different between adjacent forward apexes, so as to form a non-repeating phase waveform shape. The waveform-shaped hardwall-acoustic liner interface 221 in the aspects of FIGS. 21 to 23 may be arranged along a cutaway angle 222. Of course, the waveform-shaped hardwall-acoustic liner interface 221 may include more than three forward apexes and more than three aft apexes and the circumferential phase 236 is determined based on the number of forward apexes and the number of aft apexes. In addition, while FIG. 22 depicts the first forward apex 224 as being aligned circumferentially with the lower side 108, this need not be the case and each of the apexes may be shifted circumferentially with respect to the lower side 108.

In an alternative implementation, the inlet lip 62 may also vary circumferentially and axially. For example, instead of the forward portion 65 of the inlet lip 62 being generally aligned parallel to the highlight plane 200 about the entire circumference of the inlet lip 62, the inlet lip 62 may be an inlet lip 62(*b*) in which a forward portion 65(*b*) of the inlet lip 62(*b*) is generally contoured to be parallel with the waveform-shaped hardwall-acoustic liner interface 221.

While the foregoing description relates generally to a gas turbine engine, the gas turbine engine may be implemented in various environments or for various types of engines. For example, the engine may be implemented in an aircraft but may be electrically instead of gas powered. The engine may also be implemented in non-aircraft applications, such as power generating stations, marine applications, or oil and gas production applications. Thus, the present disclosure is not limited to use in aircraft.

The foregoing aspects of the present disclosure provide a technique to alter the reflection of an acoustic wave propagating back through an inlet duct of a nacelle so as to alter the magnitude and phase of the acoustic wave in order to reduce flutter bite of the fan blades. As a result, the operation of the fan at various operating conditions can be made more stable.

Further aspects of the present disclosure are provided by the subject matter of the following clauses.

An inlet duct for a nacelle of a ducted fan engine, the inlet duct having an inner circumferential surface extending in a circumferential direction about an inlet centerline axis and extending in an axial direction along the inlet centerline axis, the inlet duct including an inlet portion at an upstream end of the inlet duct, an acoustic liner arranged downstream of the inlet portion, and a fan section arranged downstream of the acoustic liner, wherein the inlet portion and the acoustic liner are coupled together at an inlet-acoustic liner interface extending circumferentially about the inner circumferential surface of the inlet duct, and the acoustic liner and the fan section are coupled together at a fan section-acoustic liner interface extending circumferentially about the inner circumferential surface of the inlet duct, and at least one of the acoustic liner, the inlet-acoustic liner interface, and the fan section-acoustic liner interface being configured to circumferentially alter a magnitude and a phase of an acoustic wave reflection of the inlet duct to attenuate flutter bite of a fan.

The inlet duct according to the preceding clause, wherein the inlet duct includes a plurality of projections extending beyond a surface of the acoustic liner into the inlet duct, the plurality of projections being arranged spaced apart from one another in a circumferential direction and arranged at a same axial location along the inlet centerline axis.

The inlet duct according to any preceding clause, wherein the inlet duct includes a plurality of projections extending beyond a surface of the acoustic liner into the inlet duct, the plurality of projections being arranged spaced apart from one another in a circumferential direction and being arranged at different axial locations along the inlet centerline axis.

The inlet duct according to any preceding clause, wherein the plurality of projections includes a first group of projections arranged at a first axial location and a second group of projections arranged at a second axial location downstream of the first group of projections.

The inlet duct according to any preceding clause, wherein the first group of projections are arranged adjacent to the hardwall-acoustic liner interface.

The inlet duct according to any preceding clause, wherein the plurality of projections includes a first group of projections arranged at a first angle with respect to the centerline axis and a second group of projections arranged at a second angle with respect to the centerline axis.

The inlet duct according to any preceding clause, wherein the first group of projections and the second group of projections define a v-shaped group of projections.

The inlet duct according to any preceding clause, wherein the inlet portion includes a hardwall surface on the inner surface of the inlet duct, the inlet-acoustic liner interface comprises a hardwall-acoustic liner interface, and the hardwall-acoustic liner interface varies circumferentially and axially about the inner surface of the inlet duct to alter the magnitude and the phase of the acoustic wave reflection.

The inlet duct according to any preceding clause, wherein the acoustic liner is configured to have a circumferentially varying impedance about the inlet duct.

The inlet duct according to any preceding clause, wherein the fan section-acoustic liner interface varies circumferentially and axially about the inner surface of the inlet duct to alter the magnitude and the phase of the acoustic wave reflection.

The inlet duct according to any preceding clause, wherein the inlet portion includes an inlet lip that includes at least one non-axisymmetric lip liner.

The inlet duct according to any preceding clause, wherein the acoustic liner includes a plurality of acoustic liner sections including a first acoustic liner section having a first hardwall-acoustic liner interface, a second acoustic liner section arranged circumferentially adjacent to the first acoustic liner section and having a second hardwall-acoustic liner interface, and a third acoustic liner section arranged circumferentially adjacent to the second acoustic liner section and having a third hardwall-acoustic liner interface, the second hardwall-acoustic liner interface being circumferentially and axially offset from the first hardwall-acoustic liner interface and from the third hardwall-acoustic liner interface.

The inlet duct according to any preceding clause, wherein the inlet portion defines a highlight plane, and the hardwall-acoustic liner interface extends in the circumferential direction and in the axial direction at a scarf angle in a downstream direction with respect to the highlight plane.

The inlet duct according to any preceding clause, wherein the inlet portion defines a highlight plane, and the hardwall-acoustic liner interface varying in the circumferential direction and in the axial direction and including a plurality of upstream apexes and a plurality of downstream apexes about the circumference of the inlet duct.

The inlet duct according to any preceding clause, wherein the inlet portion varies in the circumferential direction and in the axial direction, and the hardwall-acoustic liner interface is arranged parallel to the inlet portion.

The inlet duct according to any preceding clause, wherein the acoustic liner includes a sub-liner portion connected with a perforated surface panel, the sub-liner portion including a plurality of cavities including (a) a first group having a plurality of cavities arranged in an array that includes a plurality of cavities arranged adjacent to one another in the axial direction and in the circumferential direction, and (b)

a second group having a plurality of cavities arranged in an array that includes a plurality of cavities arranged adjacent to one another in the axial direction and in the circumferential direction, the second group being arranged downstream in the axial direction of the first group, and the plurality of cavities in the second group having a first volume different from a second volume of the plurality of cavities in the first group.

The inlet duct according to any preceding clause, wherein the acoustic liner includes a perforated surface panel having a plurality of perforations arranged circumferentially and axially about the inner surface of the inlet duct, the plurality of perforations including a first group of perforations and a second group of perforations, the first group of perforations being configured to have a different impedance value than the second group of perforations.

The inlet duct according to any preceding clause, wherein the first group of perforations include perforations having a different size and/or a different shape than the perforations in the second group of perforations.

The inlet duct according to any preceding clause, wherein the first group of perforations include filled-in perforations, and the second group of perforations include non-filled-in perforations.

The inlet duct according to any preceding clause, wherein the first group of perforations are arranged adjacent to the hardwall-acoustic liner interface, and the second group of perforations are arranged downstream of the first group of perforations.

The inlet duct according to any preceding clause, wherein the first group of perforations are arranged adjacent to the fan section interface, and the second group of perforations are arranged upstream of the first group of perforations.

The inlet duct according to any preceding clause, wherein the first group of perforations are arranged to define a v-shaped group of filled-in perforations.

The inlet duct according to any preceding clause, wherein the acoustic liner includes a sub-liner portion connected with a perforated surface panel and connected with a backside panel, the sub-liner portion including a plurality of cavities each having drainage slots at the backside panel, the acoustic liner including a plurality of acoustic liner sections arranged adjacent to one another in a circumferential direction, a first acoustic liner section of the plurality of acoustic liner sections having a first sub-liner portion with a first type of drainage slots, and a second acoustic liner section of the plurality of acoustic liner sections circumferentially adjacent to the first acoustic liner section having a second sub liner portion with a second type of drainage slots different from the first type of drainage slots.

The inlet duct according to any preceding clause, wherein the first acoustic liner section (122) and the second acoustic liner section are arranged along a bottom side of the inlet duct.

A ducted fan engine including a fan assembly coupled to and driven by a drive mechanism, and a nacelle surrounding the drive mechanism and the fan assembly, the nacelle including an inlet duct arranged upstream of the fan assembly, the inlet duct including an inlet portion at an upstream end of the inlet duct, an acoustic liner arranged downstream of the inlet portion, and a fan section arranged downstream of the acoustic liner, wherein the inlet portion and the acoustic liner are coupled together at an inlet-acoustic liner interface extending circumferentially about an inner circumferential surface of the inlet duct, and the acoustic liner and the fan section are coupled together at a fan section-acoustic liner interface extending circumferentially about the inner circumferential surface of the inlet duct, and at least one of the acoustic liner, the inlet-acoustic liner interface, and the fan section-acoustic liner interface being configured to circumferentially alter a magnitude and a phase of an acoustic wave reflection of the inlet duct to attenuate flutter bite of a fan.

The ducted fan engine according to the preceding clause, wherein the inlet duct defines a circumferential direction about an inlet centerline axis and an axial direction along the inlet centerline axis, the inlet portion comprises a hardwall surface and the inlet-acoustic liner interface comprises a hardwall-acoustic liner interface, the acoustic liner including a plurality of acoustic liner sections including a first acoustic liner section having a first hardwall-acoustic liner interface, a second acoustic liner section arranged circumferentially adjacent to the first acoustic liner section and having a second hardwall-acoustic liner interface, and a third acoustic liner section arranged circumferentially adjacent to the second acoustic liner section and having a third hardwall-acoustic liner interface, the second hardwall-acoustic liner interface being circumferentially and axially offset from the first hardwall-acoustic liner interface and the third hardwall-acoustic liner interface.

The ducted fan engine according to any preceding clause, wherein the acoustic liner includes a sub-liner portion connected with a perforated surface panel, the sub-liner portion including a plurality of cavities including (a) a first group of cavities, and (b) a second group of cavities arranged downstream of the first group of cavities, at least a portion of the cavities in the first group of cavities having a first volume different from a second volume of the cavities in the second group of cavities.

The ducted fan engine according to any preceding clause, wherein the inlet portion comprises a hardwall surface and the inlet-acoustic liner interface comprises a hardwall-acoustic liner interface, the hardwall-acoustic liner interface varying in a circumferential direction and in an axial direction and including a plurality of upstream apexes and a plurality of downstream apexes about a circumference of the inlet duct.

The ducted fan engine according to any preceding clause, wherein the inlet duct includes a plurality of projections extending beyond a surface of the acoustic liner into the inlet duct, the plurality of projections being arranged spaced apart from one another in a circumferential direction and arranged at a same axial location along the inlet centerline axis.

The ducted fan engine according to any preceding clause, wherein the inlet duct includes a plurality of projections extending beyond a surface of the acoustic liner into the inlet duct, the plurality of projections being arranged spaced apart from one another in a circumferential direction and being arranged at different axial locations along the inlet centerline axis.

The ducted fan engine according to any preceding clause, wherein the inlet portion includes a hardwall surface on the inner surface of the inlet duct, the inlet-acoustic liner interface comprises a hardwall-acoustic liner interface, and the hardwall-acoustic liner interface varies circumferentially and axially about the inner surface of the inlet duct to alter the magnitude and the phase of the acoustic wave reflection.

The ducted fan engine according to any preceding clause, wherein the acoustic liner is configured to have a circumferentially varying impedance about the inlet duct.

The ducted fan engine according to any preceding clause, wherein the fan section-acoustic liner interface varies circumferentially and axially about the inner surface of the inlet duct to alter the magnitude and the phase of the acoustic wave reflection.

The ducted fan engine according to any preceding clause, wherein the inlet portion includes an inlet lip that includes at least one non-axisymmetric lip liner.

The ducted fan engine according to any preceding clause, wherein the inlet portion defines a highlight plane, and the hardwall-acoustic liner interface extends in the circumferential direction and in the axial direction at a scarf angle in a downstream direction with respect to the highlight plane.

The ducted fan engine according to any preceding clause, wherein the inlet portion defines a highlight plane, and the hardwall-acoustic liner interface varying in the circumferential direction and in the axial direction and including a plurality of upstream apexes and a plurality of downstream apexes about the circumference of the inlet duct.

The ducted fan engine according to any preceding clause, wherein the inlet portion varies in the circumferential direction and in the axial direction, and the hardwall-acoustic liner interface is arranged parallel to the inlet portion.

The ducted fan engine according to any preceding clause, wherein the acoustic liner includes a perforated surface panel having a plurality of perforations arranged circumferentially and axially about the inner surface of the inlet duct, the plurality of perforations including a first group of perforations and a second group of perforations, the first group of perforations being configured to have a different impedance value than the second group of perforations.

The ducted fan engine according to any preceding clause, wherein the first group of perforations include perforations having a different size and/or a different shape than the perforations in the second group of perforations.

The ducted fan engine according to any preceding clause, wherein the acoustic liner includes a sub-liner portion connected with a perforated surface panel and connected with a backside panel, the sub-liner portion including a plurality of cavities each having drainage slots at the backside panel, the acoustic liner including a plurality of acoustic liner sections arranged adjacent to one another in a circumferential direction, a first acoustic liner section of the plurality of acoustic liner sections having a first sub-liner portion with a first type of drainage slots, and a second acoustic liner section of the plurality of acoustic liner sections circumferentially adjacent to the first acoustic liner section having a second sub liner portion with a second type of drainage slots different from the first type of drainage slots.

The ducted fan engine according to any preceding clause, wherein the first acoustic liner section and the second acoustic liner section are arranged along a bottom side of the inlet duct.

An inlet duct for a nacelle of a ducted fan engine, the inlet duct having an inner circumferential surface extending in a circumferential direction about an inlet centerline axis and extending in an axial direction along the inlet centerline axis, the inlet duct including an inlet portion at an upstream end of the inlet duct, an acoustic liner arranged downstream of the inlet portion, and a fan section arranged downstream of the acoustic liner, wherein the inlet portion and the acoustic liner are coupled together at an inlet-acoustic liner interface extending circumferentially about the inner circumferential surface of the inlet duct, and the acoustic liner and the fan section are coupled together at a fan section-acoustic liner interface extending circumferentially about the inner circumferential surface of the inlet duct, and the acoustic liner being configured to circumferentially alter a magnitude and a phase of an acoustic wave reflection of the inlet duct to attenuate flutter bite of a fan.

The inlet duct according to the preceding clause, wherein the inlet duct includes a plurality of projections extending beyond a surface of the acoustic liner into the inlet duct, the plurality of projections being arranged spaced apart from one another in a circumferential direction and arranged at a same axial location along the inlet centerline axis.

The inlet duct according to any preceding clause, wherein the inlet duct includes a plurality of projections extending beyond a surface of the acoustic liner into the inlet duct, the plurality of projections being arranged spaced apart from one another in a circumferential direction and being arranged at different axial locations along the inlet centerline axis.

The inlet duct according to any preceding clause, wherein the acoustic liner is configured to have a circumferentially varying impedance about the inlet duct.

The inlet duct according to any preceding clause, wherein the inlet portion includes an inlet lip that includes at least one non-axisymmetric lip liner.

The inlet duct according to any preceding clause, wherein the acoustic liner includes a sub-liner portion connected with a perforated surface panel, the sub-liner portion including a plurality of cavities including (a) a first group having a plurality of cavities arranged in an array that includes a plurality of cavities arranged adjacent to one another in the axial direction and in the circumferential direction, and (b) a second group having a plurality of cavities arranged in an array that includes a plurality of cavities arranged adjacent to one another in the axial direction and in the circumferential direction, the second group being arranged downstream in the axial direction of the first group, and the plurality of cavities in the second group having a first volume different from a second volume of the plurality of cavities in the first group.

The inlet duct according to any preceding clause, wherein the acoustic liner includes a perforated surface panel having a plurality of perforations arranged circumferentially and axially about the inner surface of the inlet duct, the plurality of perforations including a first group of perforations and a second group of perforations, the first group of perforations being configured to have a different impedance value than the second group of perforations.

The inlet duct according to any preceding clause, wherein the first group of perforations include perforations having a different size and/or a different shape than the perforations in the second group of perforations.

The inlet duct according to any preceding clause, wherein the acoustic liner includes a sub-liner portion connected with a perforated surface panel and connected with a backside panel, the sub-liner portion including a plurality of cavities each having drainage slots at the backside panel, the acoustic liner including a plurality of acoustic liner sections arranged adjacent to one another in a circumferential direction, a first acoustic liner section of the plurality of acoustic liner sections having a first sub-liner portion with a first type of drainage slots, and a second acoustic liner section of the plurality of acoustic liner sections circumferentially adjacent to the first acoustic liner section having a second sub liner portion with a second type of drainage slots different from the first type of drainage slots.

The inlet duct according to any preceding clause, wherein the first acoustic liner section and the second acoustic liner section are arranged along a bottom side of the inlet duct.

An inlet duct for a nacelle of a ducted fan engine, the inlet duct having an inner circumferential surface extending in a circumferential direction about an inlet centerline axis and extending in an axial direction along the inlet centerline axis, the inlet duct including an inlet portion at an upstream end of the inlet duct, an acoustic liner arranged downstream of the inlet portion, and a fan section arranged downstream of the acoustic liner, wherein the inlet portion and the acoustic liner are coupled together at an inlet-acoustic liner interface extending circumferentially about the inner circumferential surface of the inlet duct, and the acoustic liner and the fan section are coupled together at a fan section-acoustic liner interface extending circumferentially about the inner circumferential surface of the inlet duct, and the inlet-acoustic liner interface being configured to circumferentially alter a magnitude and a phase of an acoustic wave reflection of the inlet duct to attenuate flutter bite of a fan.

The inlet duct according to the preceding clause, wherein the inlet portion includes a hardwall surface on the inner surface of the inlet duct, the inlet-acoustic liner interface comprises a hardwall-acoustic liner interface, and the hardwall-acoustic liner interface varies circumferentially and axially about the inner surface of the inlet duct to alter the magnitude and the phase of the acoustic wave reflection.

The inlet duct according to any preceding clause, wherein the acoustic liner includes a plurality of acoustic liner sections including a first acoustic liner section having a first hardwall-acoustic liner interface, a second acoustic liner section arranged circumferentially adjacent to the first acoustic liner section and having a second hardwall-acoustic liner interface, and a third acoustic liner section arranged circumferentially adjacent to the second acoustic liner section and having a third hardwall-acoustic liner interface, the second hardwall-acoustic liner interface being circumferentially and axially offset from the first hardwall-acoustic liner interface and from the third hardwall-acoustic liner interface.

The inlet duct according to any preceding clause, wherein the inlet portion defines a highlight plane, and the hardwall-acoustic liner interface extends in the circumferential direction and in the axial direction at a scarf angle in a downstream direction with respect to the highlight plane.

The inlet duct according to any preceding clause, wherein the inlet portion defines a highlight plane, and the hardwall-acoustic liner interface varying in the circumferential direction and in the axial direction and including a plurality of upstream apexes and a plurality of downstream apexes about the circumference of the inlet duct.

The inlet duct according to any preceding clause, wherein the inlet portion varies in the circumferential direction and in the axial direction, and the hardwall-acoustic liner interface is arranged parallel to the inlet portion.

An inlet duct for a nacelle of a ducted fan engine, the inlet duct having an inner circumferential surface extending in a circumferential direction about an inlet centerline axis and extending in an axial direction along the inlet centerline axis, the inlet duct including an inlet portion at an upstream end of the inlet duct, an acoustic liner arranged downstream of the inlet portion, and a fan section arranged downstream of the acoustic liner, wherein the inlet portion and the acoustic liner are coupled together at an inlet-acoustic liner interface extending circumferentially about the inner circumferential surface of the inlet duct, and the acoustic liner and the fan section are coupled together at a fan section-acoustic liner interface extending circumferentially about the inner circumferential surface of the inlet duct, and the fan section-acoustic liner interface being configured to circumferentially alter a magnitude and a phase of an acoustic wave reflection of the inlet duct to attenuate flutter bite of a fan.

The inlet duct according to the preceding clause, wherein the fan section-acoustic liner interface varies circumferentially and axially about the inner surface of the inlet duct to alter the magnitude and the phase of the acoustic wave reflection.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. An inlet duct for a nacelle of a ducted fan engine, the inlet duct having an inner circumferential surface extending in a circumferential direction about an inlet centerline axis and extending in an axial direction along the inlet centerline axis, the inlet duct comprising:

an inlet portion arranged at an upstream end of the inlet duct, the inlet portion including an inlet lip and a hardwall portion, a highlight plane being defined at an upstream end of the inlet portion; and an acoustic liner arranged downstream of the inlet portion, a hardwall-acoustic liner interface being defined at an interface of the hardwall portion and the acoustic liner, wherein (a) the inlet portion and the acoustic liner are coupled together at an inlet-acoustic liner interface extending circumferentially about the inner circumferential surface of the inlet duct, (b) the inlet lip varies circumferentially and axially with respect to the highlight plane and the inlet centerline axis, (c) the inlet lip includes a plurality of inlet lip crests arranged along the highlight plane, and a plurality of inlet lip troughs arranged downstream of the highlight plane, and (d) the hardwall-acoustic liner interface extends circumferentially about the inner circumferential surface and is arranged axially parallel to the highlight plane.

2. The inlet duct according to claim 1, wherein the plurality of inlet lip crests is two inlet lip crests, and the plurality of inlet lip troughs is two inlet lip troughs.

3. The inlet duct according to claim 1, wherein the plurality of inlet lip crests is three inlet lip crests, and the plurality of inlet lip troughs is three inlet lip troughs.

4. The inlet duct according to claim 2, wherein a first one of the two inlet lip crests is arranged on a bottom portion of the inlet duct, and a second one of the two inlet lip crests is arranged on a top portion of the inlet duct.

5. The inlet duct according to claim 1, wherein the highlight plane is orthogonal to the inlet centerline axis.

6. The inlet duct according to claim 1, wherein the inlet duct includes a plurality of projections extending beyond a surface of the acoustic liner into the inlet duct, the plurality of projections being arranged spaced apart from one another in a circumferential direction and arranged at a same axial location along the inlet centerline axis.

7. The inlet duct according to claim 1, wherein the inlet duct includes a plurality of projections extending beyond a surface of the acoustic liner into the inlet duct, the plurality of projections being arranged spaced apart from one another in a circumferential direction and being arranged at different axial locations along the inlet centerline axis.

8. The inlet duct according to claim 1, wherein the acoustic liner is configured to have a circumferentially varying impedance about the inlet duct.

9. The inlet duct according to claim 1, wherein the acoustic liner includes a sub-liner portion connected with a perforated surface panel, the sub-liner portion including a plurality of cavities including (a) a first group having a plurality of cavities arranged in an array that includes a plurality of cavities arranged adjacent to one another in the axial direction and in the circumferential direction, and (b) a second group having a plurality of cavities arranged in an array that includes a plurality of cavities arranged adjacent to one another in the axial direction and in the circumferential direction, the second group being arranged downstream in the axial direction of the first group, and the plurality of cavities in the second group having a first volume different from a second volume of the plurality of cavities in the first group.

10. The inlet duct according to claim 1, wherein the acoustic liner includes a perforated surface panel having a plurality of perforations arranged circumferentially and axially about the inner circumferential surface of the inlet duct, the plurality of perforations including a first group of perforations and a second group of perforations, the first group of perforations being configured to have a different impedance value than the second group of perforations.

11. The inlet duct according to claim 10, wherein the first group of perforations include perforations having a different size and/or a different shape than the perforations in the second group of perforations.

12. The inlet duct according to claim 1, wherein the acoustic liner includes a sub-liner portion connected with a perforated surface panel and connected with a backside panel, the sub-liner portion including a plurality of cavities each having drainage slots at the backside panel, the acoustic liner including a plurality of acoustic liner sections arranged adjacent to one another in a circumferential direction, a first acoustic liner section of the plurality of acoustic liner sections having a first sub-liner portion with a first type of drainage slots, and a second acoustic liner section of the plurality of acoustic liner sections circumferentially adjacent to the first acoustic liner section having a second sub liner portion with a second type of drainage slots different from the first type of drainage slots.

13. The inlet duct according to claim 12, wherein the first acoustic liner section and the second acoustic liner section are arranged along a bottom side of the inlet duct.

14. The inlet duct according to claim 1 further comprising:

a fan section arranged downstream of the acoustic liner, the acoustic liner and the fan section being coupled together at a fan section-acoustic liner interface extending circumferentially about the inner circumferential surface of the inlet duct, wherein the fan section-acoustic liner interface varies circumferentially and axially about the inner circumferential surface of the inlet duct.

15. A ducted fan engine comprising:

a fan assembly coupled to and driven by a drive mechanism; and a nacelle surrounding the drive mechanism and the fan assembly, the nacelle including an inlet duct arranged upstream of the fan assembly, the inlet duct having an inner circumferential surface extending in a circumferential direction about an inlet centerline axis and extending in an axial direction along the inlet centerline axis, and the inlet duct including:

an inlet portion at an upstream end of the inlet duct, the inlet portion including an inlet lip and a hardwall portion, a highlight plane being defined at an upstream end of the inlet portion;

an acoustic liner arranged downstream of the inlet portion, a hardwall-acoustic liner interface being defined at an interface of the hardwall portion and the acoustic liner; and a fan section arranged downstream of the acoustic liner, wherein (a) the inlet portion and the acoustic liner are coupled together at an inlet-acoustic liner interface extending circumferentially about the inner circumferential surface of the inlet duct, (b) the inlet lip varies circumferentially and axially with respect to the highlight plane and the inlet centerline axis, (c) the inlet lip includes a plurality of inlet lip crests arranged along the highlight plane, and a plurality of inlet lip troughs arranged downstream of the highlight plane, and (d) the hardwall-acoustic liner interface extends circumferentially about the inner circumferential surface and is arranged axially parallel to the highlight plane.

16. The ducted fan engine according to claim 15, wherein the acoustic liner includes a sub-liner portion connected with a perforated surface panel, the sub-liner portion including a plurality of cavities including (a) a first group of cavities, and (b) a second group of cavities arranged downstream of the first group of cavities, at least a portion of the cavities in the first group of cavities having a first volume different from a second volume of the cavities in the second group of cavities.

17. The ducted fan engine according to claim 15, wherein the plurality of inlet lip crests is two inlet lip crests, and the plurality of inlet lip troughs is two inlet lip troughs.

18. The ducted fan engine according to claim 15, wherein the plurality of inlet lip crests is three inlet lip crests, and the plurality of inlet lip troughs is three inlet lip troughs.

19. The ducted fan engine according to claim 15, wherein the highlight plane is orthogonal to the inlet centerline axis.

20. The ducted fan engine according to claim 15, wherein the inlet duct includes a plurality of projections extending beyond a surface of the acoustic liner into the inlet duct, the plurality of projections being arranged spaced apart from one another in a circumferential direction and arranged at least one of a same axial location along the inlet centerline axis, or at different axial locations along the inlet centerline axis.

* * * * *